United States Patent
Yamada et al.

(10) Patent No.: US 7,731,591 B2
(45) Date of Patent: Jun. 8, 2010

(54) GAME APPARATUS AND BACKUP WRITING CONTROL METHOD

(75) Inventors: Yoichi Yamada, Kyoto (JP); Daiki Iwamoto, Kyoto (JP); Koichi Kawamoto, Kyoto (JP); Naoki Koga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1116 days.

(21) Appl. No.: 10/722,536

(22) Filed: Nov. 28, 2003

(65) Prior Publication Data

US 2004/0106456 A1 Jun. 3, 2004

(30) Foreign Application Priority Data

Nov. 29, 2002 (JP) ............................. 2002-346699

(51) Int. Cl.
- A63F 9/24 (2006.01)
- A63F 13/00 (2006.01)
- G06F 17/00 (2006.01)
- G06F 19/00 (2006.01)

(52) U.S. Cl. .............................. 463/43; 273/1; 273/85; 463/20; 463/24; 463/25; 463/42; 345/505; 711/159

(58) Field of Classification Search .................. 463/29, 463/31, 40, 43–45; 436/25
See application file for complete search history.

(56) References Cited

U.S. PATENT DOCUMENTS

| | | | | |
|---|---|---|---|---|
| 4,858,930 A | * | 8/1989 | Sato ............................. | 463/23 |
| 5,184,830 A | * | 2/1993 | Okada et al. .................. | 463/29 |
| 5,428,528 A | * | 6/1995 | Takenouchi et al. ........... | 463/42 |
| 5,679,077 A | * | 10/1997 | Pocock et al. ................. | 463/19 |
| 5,779,549 A | * | 7/1998 | Walker et al. ................. | 463/42 |
| 6,012,983 A | * | 1/2000 | Walker et al. ................. | 463/20 |
| 6,132,315 A | * | 10/2000 | Miyamoto et al. ............ | 463/43 |
| 6,244,957 B1 | * | 6/2001 | Walker et al. ................. | 463/20 |
| 6,267,673 B1 | * | 7/2001 | Miyamoto et al. ............ | 463/31 |
| 6,406,372 B1 | * | 6/2002 | Turmell et al. ................ | 463/43 |
| 6,468,160 B2 | * | 10/2002 | Eliott .......................... | 463/43 |
| 6,508,711 B1 | * | 1/2003 | Ono ............................ | 463/43 |

(Continued)

FOREIGN PATENT DOCUMENTS

JP  2001-204966  7/2001

*Primary Examiner*—John M. Hotaling, II
*Assistant Examiner*—Paul A. D'Agostino
(74) *Attorney, Agent, or Firm*—Nixon & Vanderhye P.C.

(57) ABSTRACT

A game apparatus includes, for example, a CPU, and a ROM and/or a RAM for executing and storing game programs and game program backup data. The RAM has multiple pre-allocated backup game data storage areas for use by different game programs during their respective execution including a single-player game backup data area, a multi-player game backup data area and a shared backup data storage area. The shared backup data storage area is provided for storing information that is accessible in common by a plurality of games, and separate game backup data storage areas are provided for each of the single-player version of a game and the multi-player version of a game. If a predetermined game condition is accomplished during progress of a game by an operator playing one of the plurality of stored game programs, the CPU writes information relating to the accomplished condition to the shared backup data storage area and to the backup data storage areas for both the single-player game version and the multi-player game version corresponding to the particular game in progress in which the condition was accomplished.

14 Claims, 13 Drawing Sheets

U.S. PATENT DOCUMENTS

| | | | |
|---|---|---|---|
| 6,786,826 B2 * | 9/2004 | Himoto et al. | 463/43 |
| 6,811,490 B2 * | 11/2004 | Rubin | 463/43 |
| 6,951,516 B1 * | 10/2005 | Eguchi et al. | 463/40 |
| 7,363,443 B2 * | 4/2008 | Rubin | 711/159 |
| 2003/0114217 A1 * | 6/2003 | Walker et al. | 463/20 |
| 2003/0114227 A1 * | 6/2003 | Rubin | 463/43 |
| 2004/0121837 A1 * | 6/2004 | Chiang et al. | 463/24 |
| 2005/0090315 A1 * | 4/2005 | Pehr Rubin | 463/43 |
| 2006/0287074 A1 * | 12/2006 | Walker et al. | 463/25 |
| 2008/0068389 A1 * | 3/2008 | Bakalash et al. | 345/505 |
| 2008/0100630 A1 * | 5/2008 | Bakalash et al. | 345/505 |

* cited by examiner

CASE OF COLLECTING 10 MEDALS IN MULTI-PLAYER GAME

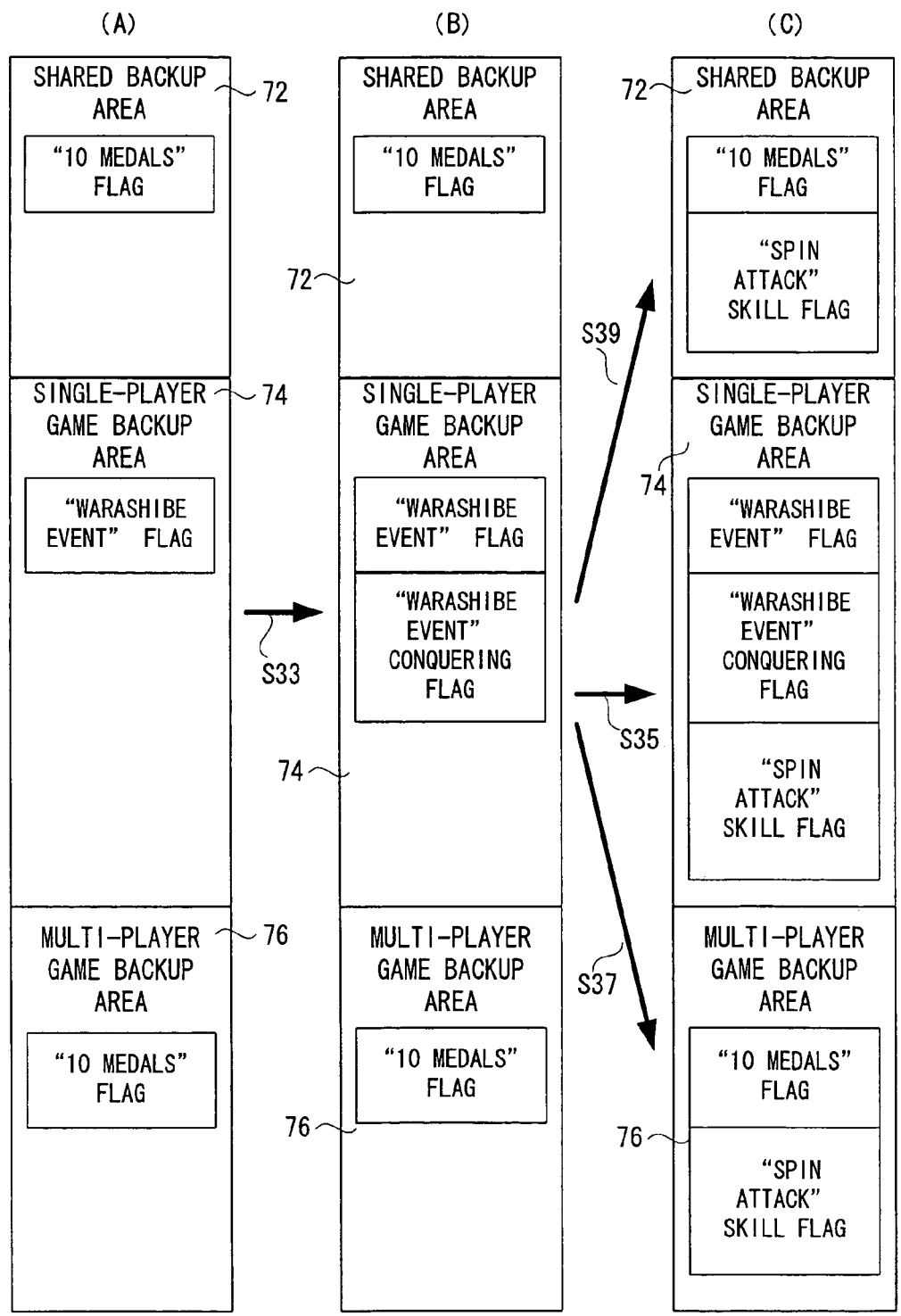
FIG. 11 CASE OF CLEARING "WARASHIBE EVENT" IN SINGLE-PLAYER GAME

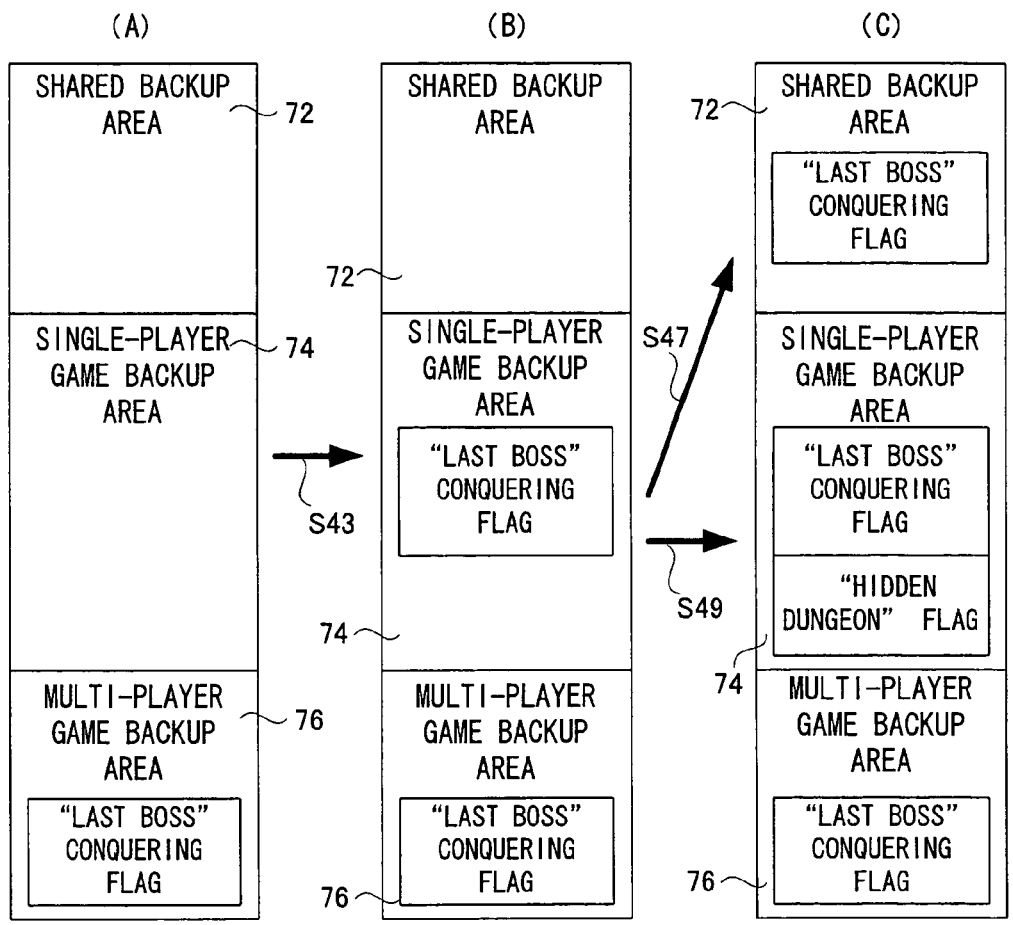
FIG. 12 CASE OF DEFEATING LAST BOSS IN SINGLE-PLAYER GAME AFTER LAST BOSS IS DEFEATED IN MULTI-PLAYER GAME

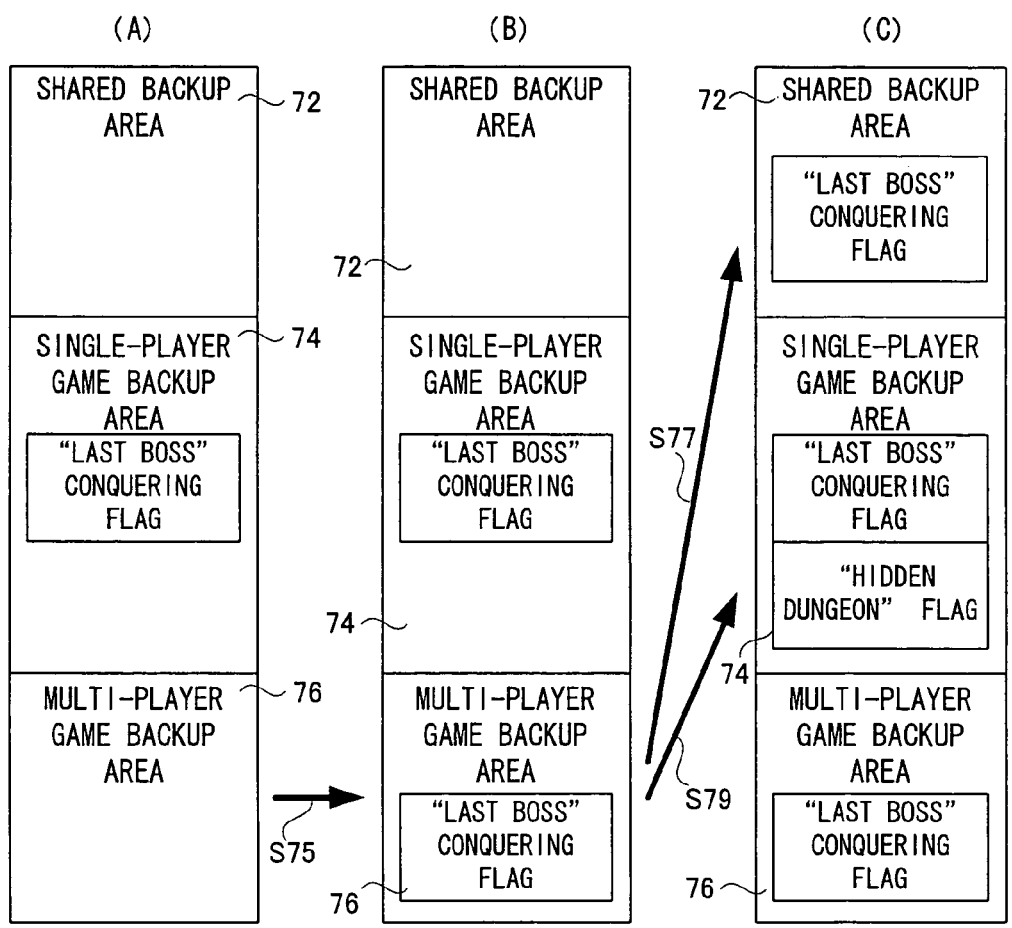
FIG. 13 CASE OF DEFEATING LAST BOSS IN MULTI-PLAYER GAME AFTER LAST BOSS IS DEFEATED IN SINGLE-PLAYER GAME

GAME APPARATUS AND BACKUP WRITING CONTROL METHOD

BACKGROUND OF THE INVENTION

1. Field of the Invention

The present invention relates to a game apparatus and a backup writing control method. More specifically, the present invention relates to a game apparatus and a backup writing control method which are capable of playing a plurality of games and sharing backup data of the plurality of games with each other and applies changes to the backup data of the plurality of games according to progress of any one of the games.

2. Description of the Prior Art

One example of such a kind of conventional game apparatus is disclosed in a Japanese Patent Laying-open No. 2001-204966 (International Classification: A63F13/10) laid-open on Jul. 31, 2001. The prior art is a game apparatus capable of playing a plurality of games related with each other. When any one of a plurality of game programs is selected and instructed to be started, another related game is searched, and a part of the game program is changed depending upon a state of the backup data of a found game.

The prior art changes, when starting the game, a content (program) thereof according to a state of the backup data of another related game so as to generate different scenario, but never brings about changes to the backup data of another related game either, for example.

Furthermore, in the prior art, backup areas are respectively provided with respect to the plurality of game programs, and data useable in common such as brightness of a screen, utilized language and etc. is set for each of the game programs and stored in each of the backup areas in a duplicated manner. Accordingly, it is necessary to prepare more capacity of the backup area than necessity, and it is troublesome to set such the common data for each of the games.

SUMMARY OF THE INVENTION

One aspect of the example non-limiting implementation illustrated herein is to provide a novel game apparatus and a backup writing control method.

Another aspect of the presently illustrated implementation is to provide a game apparatus and a backup writing control method capable of enabling a player to enjoy a game in a manner different from known prior art.

One illustrative exemplary non-limiting game apparatus implementation that is disclosed herein is able to play a plurality of games and share backup data from the plurality of games with each other. The exemplary game apparatus is implemented by a game program storing means for storing at least a first game program and a second game program; a writable and readable backup data storing means having a first backup data storing area for storing backup data relating to the first game program and a second backup data storing area for storing data relating to the second game program; an operating mechanism for instructing a start of a game by selecting any one of the first game program and the second game program and progress of the selected game; a determining means for determining whether or not a predetermined condition is accomplished in the progress of the game selected and instructed to be started; and a writing control means for writing, when it is determined the predetermined condition is accomplished, information relating to the predetermined condition to both of the backup data storing area of one game and to the backup data storing area of another game which is not selected by the operating mechanism.

For example, an examplary game apparatus (10) has the backup data of the plurality of games which is shareable with each other. The game apparatus (10) includes a game machine (12) and a cartridge (14) loaded in the game machine (12). The game program storing means includes a ROM (54) of the cartridge (14) and stores at least a single-player game program as the first game program and a multi-player game program as the second game program. The backup data storing means includes a RAM (56) of the cartridge (14), and the RAM (56) is provided with a first backup data storing area (74) and a second backup data storing area (76).

In the game apparatus (10), a first game is started and progressed according to the instruction of the operating mechanism (32) provided in the game machine (12). An example determining means is illustrated as blocks S23 or S31 in FIG. 7 or as blocks S63 or S71 in FIG. 8. A CPU (40) determines whether or not the predetermined condition is accomplished during the progress of the first game. An example writing control means is illustrated in blocks S25 to S29 or S33 to 39 in FIG. 7, or blocks S65 to S69 or blocks S73 to S79 in FIG. 8. The CPU (40) writes the information relating to the predetermined condition to both of the backup data storing area of the first game and the backup data storing area of another game when it is determined the predetermined condition is accomplished. The information relating to the predetermined condition may be condition accomplishment information indicating that the predetermined condition is accomplished, or it may be change generation information for generating changes in the progress of the game in response to the accomplishment of the predetermined condition.

In at least one aspect of the example implementation disclosed herein, it is possible to share the information between the games or generate changes in the progress of the game according to the information relating the condition written by a game progressing process (S21, S61), for example, at a time of playing the game subsequently, and therefore, it is possible to increase enjoyment at a time of playing the game.

In another aspect, the information relating to the predetermined condition includes condition accomplishment information indicating that the predetermined condition is accomplished, and the writing control means writes the condition accomplishment information to both the backup data storing area of one game and the backup data storing area of another game. An example writing control implementation is illustrated by steps S27 and S25 in FIG. 7. When it is determined that a predetermined condition (e.g. acquiring a "sword beam" skill) is accomplished (S23), the CPU (40) writes the condition accomplishment information ("sword beam" skill flag) to both of the backup data storing area of one game and the backup data storing area of another game. This makes it possible, for example, to use a "sword skill" in the progress of another game also by assuming that the above described condition is accomplished in that other game. Accordingly, it is possible to share the information in both the games and therefore, it is possible to increase enjoyment at a time of playing the game subsequently.

In yet another aspect, the information relating to the predetermined condition includes condition accomplishment information indicating that the predetermined condition is accomplished and change generation information for generating changes in the progress of the game in response to accomplishment of the predetermined condition, and the writing control means writes the condition accomplishment information to the backup data storing area of one game and writes the change generation information to the backup data storing area of another game. An example writing control implementation is illustrated by S65 and S67 in FIG. 8. When the predetermined condition (e.g., collecting "10 medals") is accomplished (S63), the CPU (40) writes the condition accomplishment information ("10 medals" flag) to the backup data storing area of one game and writes the change generation information (e.g "WARASHIBE event" flag) to the backup data storing area of another game. Therefore, a "WARASHIBE event" can be generated in the progress of another game, for example, by the game progressing process (S21). Accordingly, it is possible to bring about new enjoyment which cannot be obtained without playing one game at a time of playing another game.

In still another aspect, the information relating to the predetermined condition includes condition accomplishment information indicating that the predetermined condition is accomplished and change generation information for generating changes in the progress of the game in response to accomplishment of the predetermined condition, and the writing control mechanism writes the condition accomplishment information to the backup data storing area of one game and writes the change generation information to both of the backup data storing area of that game and the backup data storing area of another game. An example writing control implementation is illustrated by S33 to S37 in FIG. 7. When it is determined that the predetermined condition (e.g., clearing "WRASHBE event") is accomplished (S31), the CPU (40) writes the condition accomplishment information ("WARASHIBE event conquering" flag) to the backup data storing area of one game and writes the change generation information (e.g., "spin attack" skill flag) to both of the backup data storing area of the first game and the backup data storing area of the other game. Thus, it is possible to arrange game play such that a "spin attack" is useable as a new sword skill by the game progressing process (S21, S61) in both of the games. Accordingly, it is possible to share the information between both the games, and it is possible to bring about new enjoyment which cannot be obtained without playing one game at a time of playing another game.

In a further aspect of the illustrative non-limiting exemplary implementation disclosed herein, the information relating to the predetermined condition includes condition accomplishment information indicating that the predetermined condition is accomplished and change generation information for generating changes in the progress of the game in response to accomplishment of the predetermined condition, and the writing control mechanism further comprises a second determining means for determining whether or not the predetermined condition is accomplished in another game also when the predetermined condition is accomplished, writing the condition accomplishment information to the backup data area of one game when it is determined that the predetermined condition is accomplished, and writing the change generation information to the backup data storing area of another game when it is determined that the predetermined condition is also accomplished in another game. An example writing control implementation is illustrated by blocks S73, S75 and S79 in FIG. 8, and an example implementation of a second determining means is illustrated by block S75 among them in FIG. 8. When the predetermined condition (e.g., conquering the "last boss") is accomplished (S71), the CPU (40) writes the condition accomplishment information (i.e., "last boss" conquering flag) to the backup data storing area of one game. Furthermore, when it is determined that the predetermined condition (i.e., conquering the "last boss") is also accomplished by the determining means within another game, that is, when the predetermined condition is determined as being accomplished in both the games, the CPU (40) writes particular change generation information (e.g., "hidden dungeon" flag) to the backup data storing area for the other game. Therefore, in playing the other game, the game progressing process means (21) allows the "hidden dungeon" to appear. Accordingly, it is possible to bring about new enjoyment which cannot be obtained without playing both the games and further satisfying the predetermined condition in both the games at a time of playing another game.

In yet another non-limiting example implementation, the writing control means writes the change generation information to the backup data storing area of another game and also writes the same to the backup data storing area of a first game when it is determined that a predetermined condition is accomplished by a second determining means in another game. For example, when it is determined that the predetermined condition is accomplished (S75), the CPU 40 writes the change generation information to the backup data storing area of the other game and also writes the same to the backup data storing area of the first game, and therefore, it is possible to share the information between the games and also bring about new enjoyment which cannot be obtained without playing both the games and further satisfying the predetermined condition in both the games at a time of playing both the games.

In yet another aspect, the backup data storing means further comprises a shared readable and writable backup data storing area for storing backup data relating to both the first game program and the second game program, and the writing control means further writes to the shared backup data storing area shared information utilized in common to both of the first game program and the second game program. For example, the backup data storing means is further provided with a shared backup data storing area (72). Then, an example writing control means is implemented as illustrated by S29, S39 or S51 in FIG. 7, or S69, S77 or S81 in FIG. 8, and the CPU (40) writes the shared information to the shared backup data area. The shared information is utilized in common to both the games and includes, for example, a player name, initial setting data (brightness of screen or utilized language and so on), ranking data, etc. Accordingly, the shared information need not to be stored in each of the backup data storing areas, and therefore, it is possible to decrease a capacity of the backup data storing means. Furthermore, the shared information includes the information relating to the predetermined condition written when it is determined the predetermined condition is accomplished in the progress of the game, such as acquired item flag, sword skill flag, conquering flag etc. utilized for displaying a state of each game on the game selection screen.

In another non-limiting example implementation of a gaming apparatus disclosed herein, a game program is executed which is able to play a plurality of games, is able to share backup data of a plurality of games with each other, and is provided with a storing means having a plurality of storing areas for respectively storing the backup data of the plurality of games and a game operating means. The game program makes a processor of the game apparatus execute steps for determining whether or not the predetermined condition is accomplished during the progress of any one of the plurality of games instructed to be started by the game operating means; and writing, when it is determined the predetermined condition is accomplished, information relating to the predetermined condition to both the backup data storing area of one game and to the backup data storing area of another game which has not been instructed to be started by the game operating means.

Another aspect of the example implementation described herein is a backup writing control method, that is able to share backup data of a plurality of games with each other and an example game apparatus implementation that is provided with a storing means having a plurality of storing areas for respectively storing the backup data of the plurality of games and a game operating means. The exemplary non-limiting backup writing control method described herein comprises: (a) determining whether or not the predetermined condition is accomplished during the progress of any one of the plurality of games that were instructed to be started by the game operating means; and (b) writing, when it is determined the predetermined condition is accomplished in (a), information relating to the predetermined condition to both of the backup data storing area of one game and to the backup data storing area of another game which has not been instructed to be started by the game operating means.

In another non-limiting example implementation of a game apparatus disclosed herein, the implementation is able to play a plurality of games and share backup data of the plurality of games with each other. The game apparatus, comprising: a game program storing means for storing at least a first game program and a second game program; a backup data storing means having a first backup data storing area for writably readably storing backup data relating to the first game program and a second backup data storing area for writably readably storing data relating to the second game program; an operating means for instructing a start of a game by selecting any one of the first game program and the second game program and progress of the selected game; a first condition determining means for determining whether or not a predetermined condition is accomplished during the progress of one game selected and instructed to be started by the operating means; a first writing control means for writing, when it is determined that the predetermined condition is accomplished by the first condition determining means, condition accomplishment information indicating that the predetermined condition is accomplished to the backup data storing area of one game; an another condition determining means for determining whether or not the predetermined condition is accomplished in another game also which is not selected by the operating means when it is determined the predetermined condition is accomplished by the one condition determining means; and a second writing control means for writing change generation information for generating changes in the progress of the game to the backup data storing area of one game when it is determined that the predetermined condition is accomplished in another game also by the another condition determining means.

An example first condition determining means is illustrated by S41 in FIG. 7. The CPU (40) determines whether or not the predetermined condition is accomplished in the progress of the one game. An example first writing control means is illustrated by S43 in FIG. 7. The CPU (40) then writes, when it is determined that the predetermined condition is accomplished by the first condition determining means, the condition accomplishment information indicating that the predetermined condition is accomplished to the backup data storing area of one game. The other condition determining means is illustrated by S45 in FIG. 7. CPU (40) then determines whether or not the predetermined condition is also accomplished in another game when it is determined the predetermined condition is accomplished by the first condition determining means. A second writing control means is illustrated S49 in FIG. 7. CPU (40) then writes the change generation information for generating changes in the progress of the game to the backup data storing area of one game when it is determined that the predetermined condition is accomplished in another game also by the another condition determining means.

Accordingly, it is possible to bring about new enjoyment which cannot be obtained without playing both the games and further satisfying the predetermined condition in both the games at a time of playing one game.

Another aspect of the example illustrative non-limiting implementation described herein is a game apparatus that is able to play a plurality of games and share backup data of the plurality of games with each other, comprising: a game program storing means for storing at least a first game program and a second game program; a backup data storing means having a first backup data storing area for writably readably storing backup data relating to the first game program, a second backup data storing area for writably readably storing data relating to the second game program and a shared backup data storing area for writably readably storing backup data relating to both of the first game program and the second game program; and the writing control means writing to the shared backup data storing area shared information utilized in common to both of the first game program and the second game program.

For example, the backup data storing means includes the RAM (56) of the cartridge (14), and the RAM (56) is provided with a first backup data storing area (74), a second backup data storing area (76) and a shared backup data storing area (72). An example writing control means is illustrated by S29, S39, S47 or S51 in FIG. 7, or S69, S77 or S81 in FIG. 8, and the CPU (40) writes the shared information to the shared backup data storing area (72). The shared information is for being utilized in common to both the games and includes a player name, initial setting data (brightness of screen or utilized language), ranking data and etc. Accordingly, the area for the shared information need not to be provided in each of the backup data storing areas, and therefore, it is possible to decrease a capacity of the backup data storing means.

Accordingly, the shared backup area is provided, and therefore, it is also possible to save user's trouble of setting the shareable data in each of the plurality of games.

Another aspect of the example game apparatus implementation described herein is a game apparatus, further comprising: an operating means for instructing a start of the game by selecting any one of the first game program and the second game program and progress of the selected game; and a determining means for determining whether or not a predetermined condition is accomplished during the progress of one game selected and instructed to be started by the operating means; wherein the writing control means writes information relating to the predetermined condition to the shared backup data storing area as the shared information when it is determined that the predetermined condition is accomplished. For example, the writing control means writes, when it is determined that the predetermined condition is accomplished (S23, S31, S45, S63 or S75), the information relating to the predetermined condition such as acquired item flag, sword skill flag, conquering flag and etc. to the shared backup data storing area as the shared information. These are utilized for displaying a state of each game on a game selection screen, and so on. That is, it is appropriate that the shared information is read from the shared backup data area at a time of displaying the game selection screen and therefore, it is possible to save user's trouble of individually reading required information from the backup data storing area of each of the games, and thus, it is possible to speed up the process.

A game information storage medium according to further aspect of the non-limiting example implementation disclosed herein is able to play a plurality of games and is able to share backup data of the plurality of games with each other, and is utilized in a game apparatus provided with an operating means and a processing means. The example game information storage medium implementation disclosed herein has a game program storage medium for storing at least a first game program and a second game program; and a writable and readable backup data storage medium having a first backup data storing area for storing backup data relating to the first game program and a second backup data storing area for storing data relating to the second game program. The example game program storage medium further includes a determining program for determining whether or not the predetermined condition is accomplished in progress of any one of the first game program and the second game program instructed to be started by the operating means; and a writing control program for writing, when it is determined the predetermined condition is accomplished by the determining program, information relating to the predetermined condition to both the backup data storing area of one game and to the backup data storing area of another game that is not selected by the operating means.

A game information storage medium according to a further aspect of the non-limiting example implementation discussed herein is able to play a plurality of games and is able to share backup data of the plurality of games with each other, and is utilized in a game apparatus provided with an operating means and a processing means. The disclosed exemplary game information storage medium comprises a game program storage medium for storing at least a first game program and a second game program; and a writable and readable backup data storage medium having a first backup data storing area for storing backup data relating to the first game program, a second backup data storing area for storing data relating to the second game program and a shared backup data storing area for storing backup data relating to both of the first game program and the second game program. The example game program storage medium further includes a writing control program for writing to the shared backup data storing area shared information utilized in common to both of the first game program and the second game program.

A still further aspect of the exemplary implementation disclosed herein is the ability to decrease the capacity of the backup data storing means in a manner similar to another aspect of the disclosed example game apparatus implementation.

For example, at a time of selecting any one of the plurality of games and playing the same, when the predetermined condition is accomplished in at least the progress of the game, by writing the information relating to the condition to both of the backup data storing area of one game and the backup data storing area of another game, changes is generated, and therefore, it is possible to increase enjoyment at a time of playing the game subsequently. Accordingly, it is possible to bring about enjoyment different from the prior art in which the scenario of the game is changed depending upon the backup data of another game at a start of the game.

Furthermore, the shared backup data area is provided, and the shared information is written thereto, and therefore, there is no need to individually secure the area for storing the shared information in each of the backup data storing areas, and thus, it is possible to decrease a capacity of the storing means (memory) for backup data. Furthermore, it is possible to save the user the trouble of making a specific setting in each of the plurality of games.

The above described features, aspects and advantages of the disclosed exemplary non-limiting implementation of a game apparatus will become more apparent from the following detailed description when taken in conjunction with the accompanying drawings.

BRIEF DESCRIPTION OF THE DRAWINGS

FIG. 11 is an illustrative view showing a state shifting in the RAM of the cartridge in a case a "WARASHIBE event" is cleared in the single-player game;

FIG. 12 is an illustrative view showing a state shifting in the RAM of the cartridge in a case a last boss is defeated in the single-player game after the last boss is defeated in the multi-player game; and FIG. 13 is an illustrative view showing a state shifting in the RAM of the cartridge in a case the last boss is defeated in the multi-player game after the last boss is defeated in the single-player game.

DETAILED DESCRIPTION OF THE PREFERRED EMBODIMENTS

Figure 1:
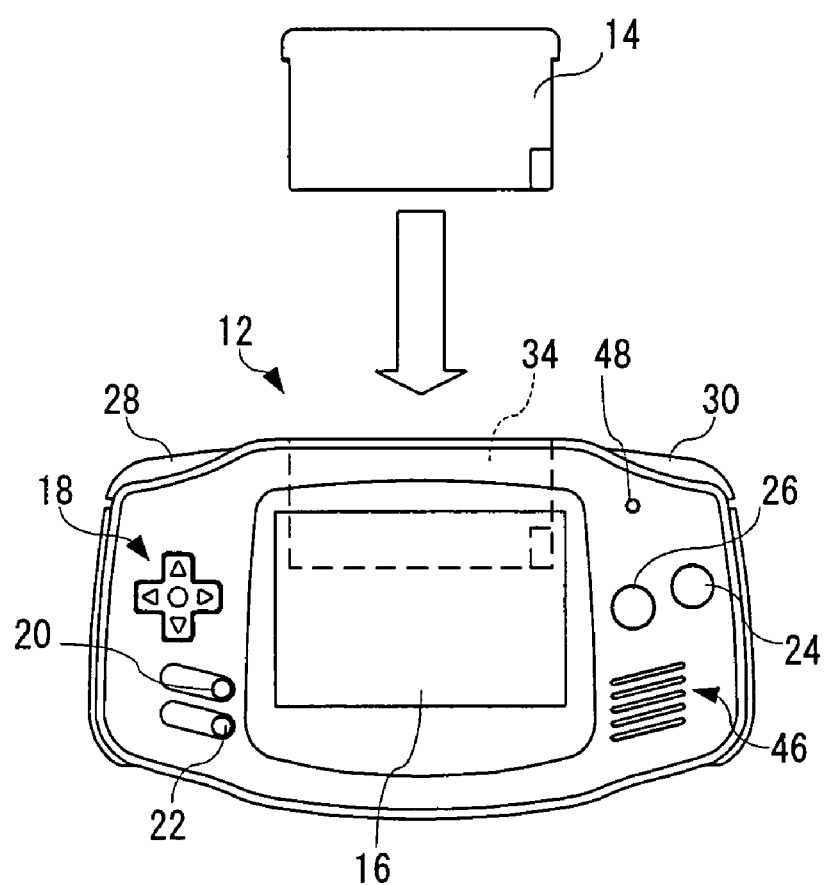
FIG. 1 is an exterior view showing a game apparatus of one embodiment of the present invention.

An examplary game apparatus 10 is shown in FIG. 1 which includes a game machine 12 and a cartridge 14 connected to the game machine 12. A portable game machine such as Nintendo's GAMEBOY ADVANCE™ is one example gaming system that is applicable as an examplary game machine 12.

A housing of the game machine 12 is provided with a color liquid crystal display (LCD) 16 at a nearly center of a front surface thereof. The LCD 16 is displayed with a game image such as a game selection screen (menu screen), game world, game characters and etc.

On the front surface of the housing, a cross button 18, a start button 20 and a select button 22 are provided at a predetermined position of the left of the LCD 16, and an A button 24 and a B button 26 are provided at a predetermined position of the right of the LCD 16. Furthermore, an L button 28 and an R button 30 are provided at right and left end portions on an upper surface of the housing. Respective buttons are operating buttons for operating a game by a user and are collectively shown as an operating portion 32 in FIG. 2.

The cross key 18 functions as a direction switching key and can move a game character, a cursor and etc. which are displayed on the LCD 16 in a top-to-bottom or left-to-right direction. The start button 20 is utilized for instructing a game start, and the select button 22 is utilized for selecting a game mode and etc. Mainly, the A button 24 is utilized for selecting (determining) an item designated by the cursor, and the B button 26 is utilized for cancelling the selected item. Each of the A button 24, the B button 26, the L button 28 and the R button 30 makes the game character displayed on the LCD 16 perform an arbitrary action such as throwing, catching, jumping, cutting by a sward, talking and etc by being operated independently or in combination thereof.

Figure 2:
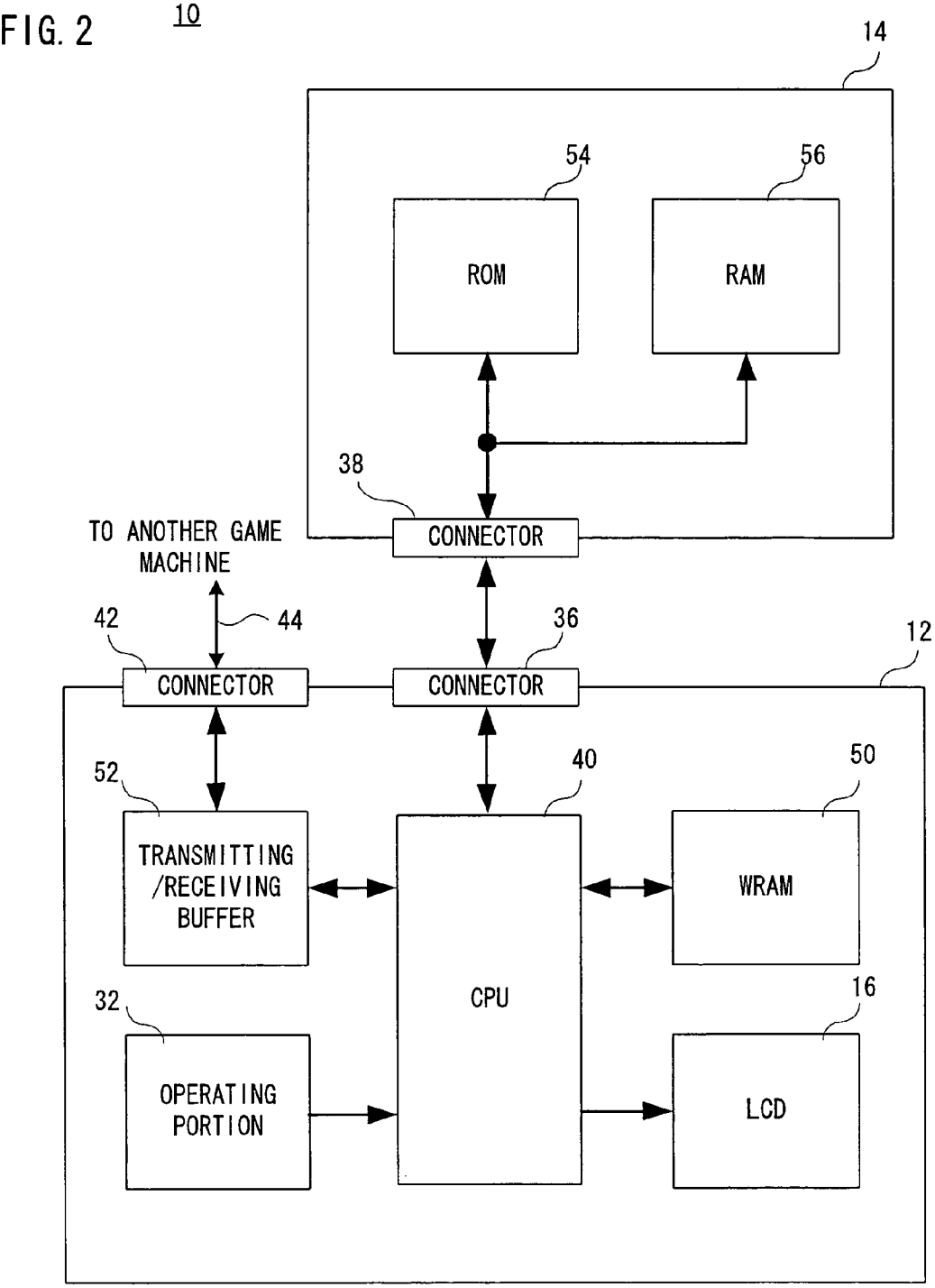
FIG. 2 is a block diagram showing one example of an internal configuration of the game apparatus of FIG. 1 embodiment.

The housing is, at a depth side of the upper surface, formed with a loading slot 34 to which the game cartridge 14 is detachably loaded. Connectors 36 and 38 connectable with each other (FIG. 2) are respectively provided at a depth portion of the loading slot 34 and at an end portion of the game cartridge 14 in the loading direction. Thus, when the connectors 36 and 38 are connected with each other, the cartridge 14 is allowed to be accessed by a CPU 40 (FIG. 2) of the game machine 12. Furthermore, the housing is, at the front side of an upper surface, provided with an external expansion connector (connector for communication) 42 (FIG. 2). The connector 42 is connected with a communication cable 44 (FIG. 3) at a time of performing an interactive play of the multi-player game.

An example game machine 12 is illustrated in FIGS. 1 and 2, and in this example, the connector 36 is a 32-pin connector at a depth portion of the upper surface, and the connector 42 is a 6-pin connector at a front portion of the upper surface.

The housing is, on its surface below the A button 24 and the B button 26, provided with a speaker 46 from which a sound such as BGM, a sound effect during the game and etc. are output. Furthermore, above the A button 24 and the B button 26, a power lamp 48 which lights up when a power is turned on and changes in color depending upon a remaining amount of a battery.

In addition, although not illustrated, the housing is provided with a battery accommodating box in which a battery is set on its rear surface and a power switch, a volume adjustment knob, a headphones connecting terminal and etc. on its bottom surface.

FIG. 2 is a block diagram of an electric configuration (internal configuration) of the game apparatus 10 (game machine 12 and cartridge 14). Referring to FIG. 2, the game machine 12 includes the CPU 40 which is called as a processor, a computer or the like and is for governing a total control of the game machine 12. The CPU 40 is connected with the LCD 16, the operating portion 32 and the connector 36 described above via an internal bus and is also connected with a working RAM (WRAM) 50, a transmitting/receiving buffer 52 and etc.

The LCD 16 is displayed with a game image in response to a display signal from the CPU 40. It is noted that although not illustrated, the CPU 40 is connected with a VRAM and an LCD controller so as to render character image data, game image data and etc. on the VRAM according to an instruction of the CPU 40. The LCD controller reads the image data rendered on the VRAM in response to an instruction of the CPU 40 and displays game images of the characters, a game screen and etc. on the LCD 16.

The operating portion 32 includes the above-described operating buttons 18, 20, 22, 24, 26, 28 and 30, and an operating signal is applied to the CPU 40 in response to an operation of each of the operating buttons. Accordingly, the CPU 40 executes a process according to an instruction of the user applied through the operating portion 32.

The WRAM 50 is utilized as a work area of the CPU 40 or a buffer area. The transmitting/receiving buffer 52 is for transmitting/receiving data at a time of performing the interactive play of the multi-player game and is connected to the external expansion connector 42. Connecting with the connector 42 of another game machine 12 by use of the communication cable 44 makes it possible to perform data communications between a plurality of game apparatus 10.

Furthermore, although not illustrated, the CPU 40 is, via a sound circuit, connected with the speakers 46 from which a sound such as game music, sound effect and etc. is output in response to a sound signal applied from the CPU.

The cartridge 14 is provided with a ROM 54 and a RAM 56 which are connected with each other via a bus and which are connected to the connector 38. Accordingly, when the cartridge 14 is loaded in the game machine 12, and whereby, when the connectors 36 and 38 are connected with each other, the CPU 40 is electrically connected to the ROM 54 and the RAM 56. Accordingly, the CPU 40 can read predetermined program data from a predetermined area of the ROM 54 so as to develop the same on the WRAM 50, can read predetermined backup data from the RAM 56 so as to write the same to the WRAM 50, and can write to a predetermined area of the RAM 56 backup data such as game data generated in the WRAM 50 according to progress of the game or condition relating information and etc.

It is noted that although the flash memory being a nonvolatile memory is applied as the RAM 56, a ferroelectric memory (FeRAM), EEPROM, and etc. may be applied as another nonvolatile memory.

Figure 4:
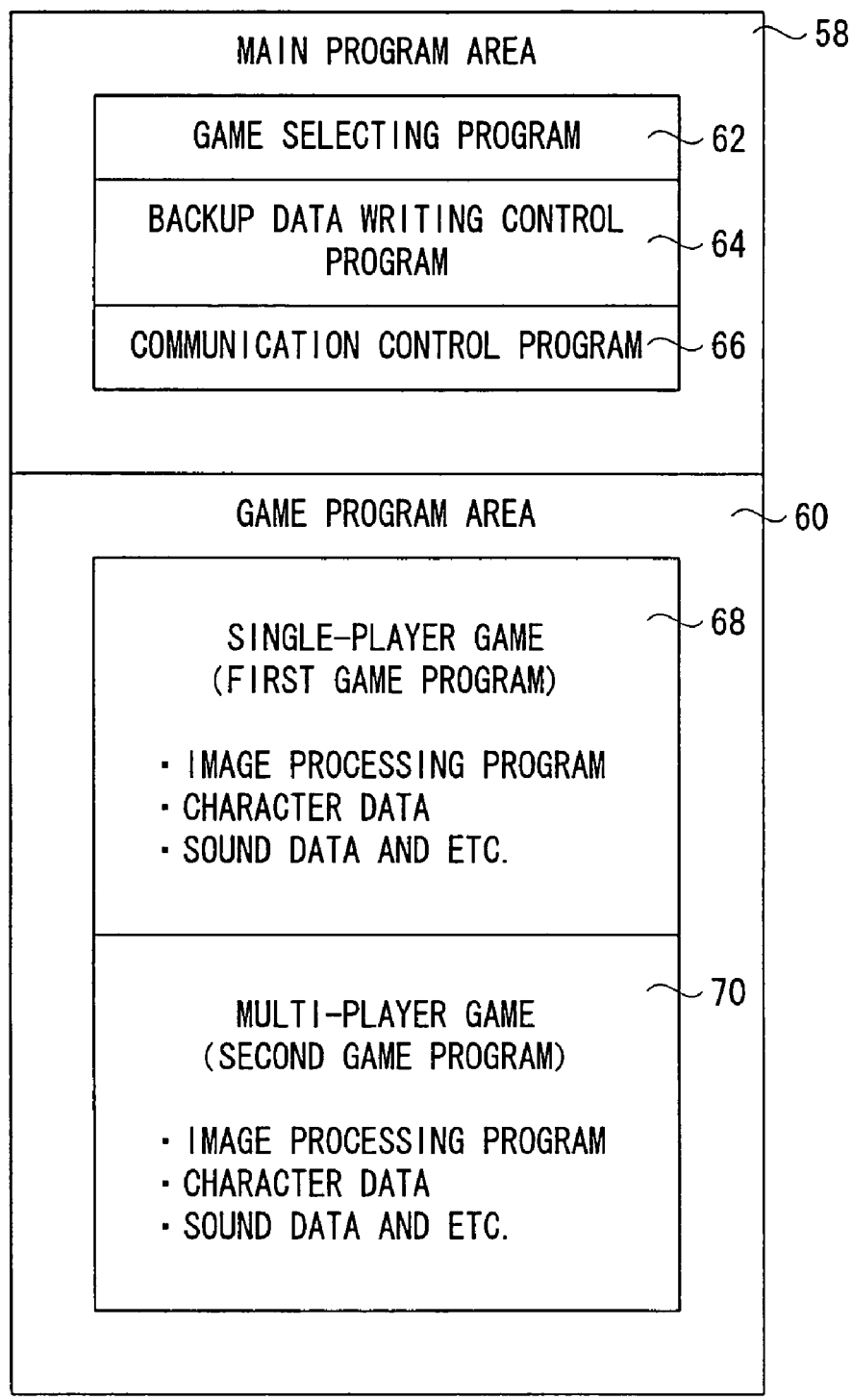
FIG. 4 is an illustrative view showing a memory map of a ROM provided in a cartridge of FIG. 2 embodiment.

The ROM 54 includes a main program area 58 and a game program area 60 as shown in FIG. 4. The main program area 58 is stored in advance with a game selecting program 62, a backup data writing control program 64, a communication control program 66 and etc. These are programs for being utilized in common between the plurality of games stored in the cartridge 14.

The game selecting program 62 is a program for making the user select which game is to be played among the plurality of games. The backup data writing control program 64 is a program for controlling writing of the backup data to the RAM 56, and this allows the predetermined backup data to be written when an instruction from the user is present, when a predetermined timing is reached or when a predetermined condition is accomplished in the game. The communication control program is a program for controlling data communication between other game machines 10 in a case a multi-player game is played.

The game program area 60 is stored with a plurality of game programs respectively required for the plurality of games stored in the game cartridge 14. In this embodiment, two game programs of a single-player game program (first game program) and a multi-player game program (second game program) are stored in the game program area 60. Each game program includes various data and programs required for playing or progressing the game such as image processing program, character data, sound data and etc. It is needless to say that more than two game programs may be stored in another embodiment.

In this embodiment, a single-player game and a multi-player game being an action role-playing game (action RPG) in genre (kind) are stored in advance. The action RPG is a game with an action game element and a role-playing game (RPG) element. That is, similarly to an RPG, a player character intends to defeat a boss (last boss) of enemy characters and adventures with growth through equipment of arms, conversation with another character, battle against the enemy characters while similarly to an action game, the player character, the equipped arms and etc. can be arbitrarily moved by an operation of the user at a time of battle.

Figure 5:
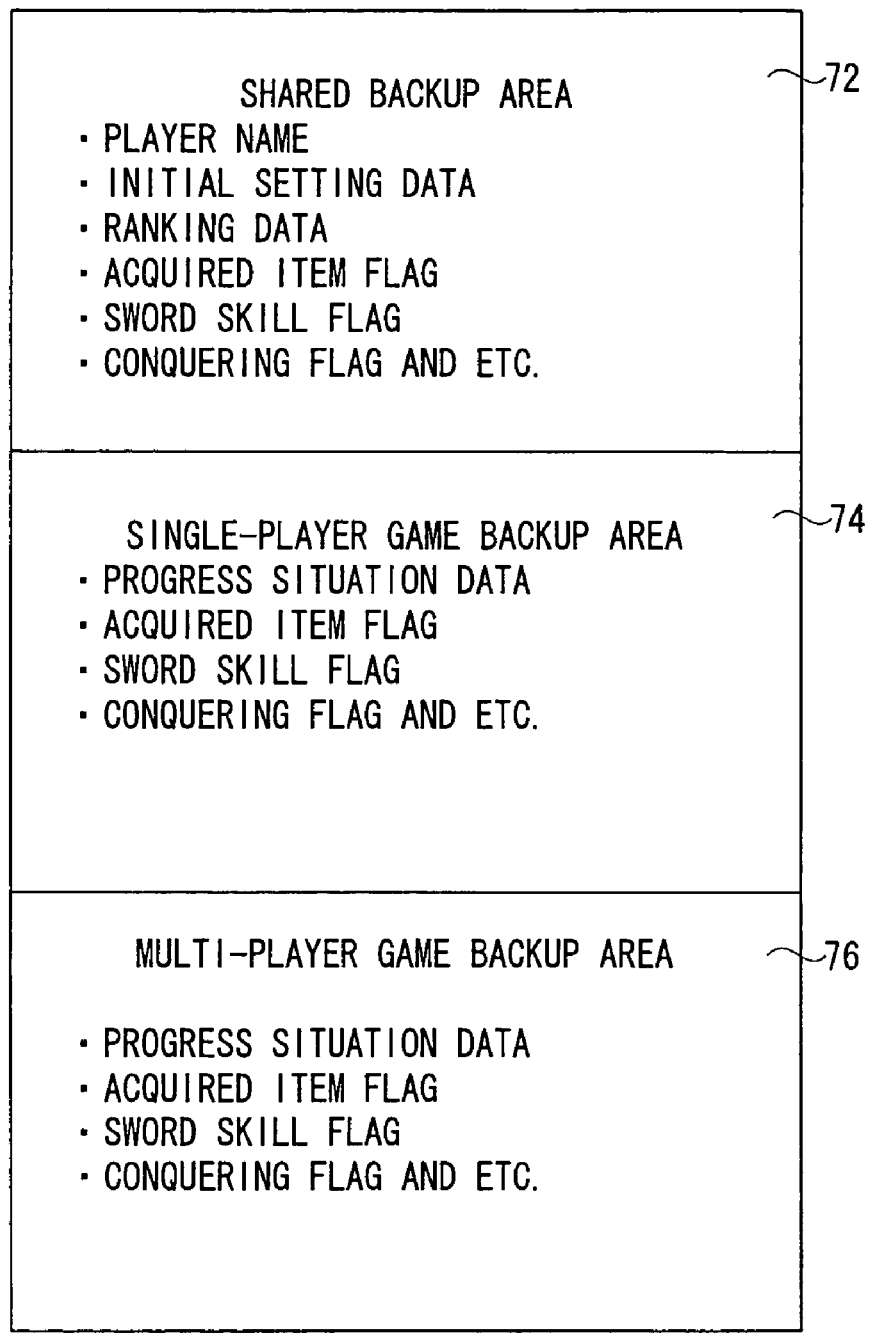
FIG. 5 is an illustrative view showing one example of a memory map of a RAM provided in the cartridge of FIG. 2 embodiment.

The RAM 56 includes, as shown in FIG. 5, a shared backup area 72, a single-player game backup area (first backup data storing area) 74 and a multi-player game backup area (second backup data storing area) 76.

The shared backup area 72 is an area for storing (reserving) backup data in common between the plurality of games. In this embodiment, a player name, initial setting data (brightness of screen, utilized language and etc.), ranking data, an acquired item flag, a sword skill flag, a conquering flag and etc. are stored as shared information utilized in common between the plurality of games.

The initial setting data such as player name, brightness of the screen, utilized language and etc. is generally even between the plurality of games. Accordingly, the data is not stored in each of the backup areas for the game programs but stored in the shared backup area 72. Then, it is appropriate that in a case the shareable data is set once and then, the game is played, the backup data is read from the shared backup area 72.

Thus, the data utilized in common between the plurality of games is not stored in each of backup areas but stored in the shared backup area 72, and therefore, there is no need to provide areas for the shared data in each of the backup areas for the game programs, and it is possible to reduce a memory capacity for backup. Furthermore, storing the data as shared information saves user's trouble of setting the sharable data in each of the plurality of games.

In addition, each of the acquired item flag, the sword skill flag, the conquering flag and etc. (information relating to the condition) is set in progresses of each game when a predetermined condition is accomplished; however, in the shared backup area 72, the flag area is set for displaying the game selection screen.

That is, the user can confirm a state of each game, i.e., kind of items acquired in each game, kind of learned sword skills, a degree of conquering and etc. on the game selection screen by the acquired item flag, the sword skill flag, the conquering flag and etc. stored in the shared backup area 72. Thus, if the information relating the condition is stored in the shared backup area 72 as the shared information, there is no need to read from each of the backup areas for the game programs at a time of displaying the game selection screen and so on, and therefore, it is possible to speed up a process. It is noted that these flags stored in the shared backup area 72 are strictly for displaying the selection screen and are read from the backup area of each game for the purpose of speed up a game progressing process at a time of progressing the game.

More specifically, the acquired item flag is related to a specific item such as a sword, a key, a medal and etc. and can be set (written) to an area corresponding to a kind of the item by acquiring the item on the game. A "10 medals" flag described later is applied thereto. The sword skill flag is related to a skill of a sword and set to an area corresponding to a kind of the sword skill by learning the sword skill anew on the game screen. A "sword beam" skill flag, a "spin attack" skill flag and etc. described later applied thereto. The conquering flag relates to course or progress of the conquering of the game and etc. and set in an area corresponding to a conquering element in response to occurrence of the conquering element such as occurrence and clearing of a specific event, conquering the bosses, conversation with a specific person and etc. A "WARASHIBE event" flag, a "WARASHIBE event" conquering flag, a "last boss" conquering flag, a "hidden dungeon" flag and etc. are applied thereto.

The single-player game backup area 74 is a backup area for storing (reserving) backup data relating to the single-player game program and is stored with progress situation data, the acquired item flag, the sword skill flag and etc.

The progress situation data is game data which is stored in response to an instruction of a data storing (saving) by the user's operation or at a predetermined timing and is information related to a game state including a game world state and a player's state which are respectively a scene of a game world and a player's level at a time of storing. When playing the game next time after completion of the game, it is possible to restart the game from a previously stored state by reading the progress situation data and etc.

The acquired item flag, the sword skill flag and the conquering flag are the same as in the above-described shared backup area 72, respectively represent the item, the sword skill and the progress of conquering and are reset when the predetermined condition is accomplished in the progress of the game or another game. It is noted that the acquired item flag, the sword skill flag, the conquering flag stored in the single-player game backup area 74 are basically for progressing the single-player game. These flags may be utilized (read) in the progress of the multi-player game by another user, but never utilized in order to display the game selection screen.

The multi-player game backup area 76 is a backup area for storing the backup data relating to the multi-player game program and is stored with the progress situation data, the acquired item flag, the sword skill flag, the conquering flag and etc. similarly to the single-player game backup area 74. A content of each data is the same as the one stored in the above-described single-player game backup area 74, and therefore, a detailed description thereof is omitted hereunder.

In the game apparatus 10, the plurality of games, i.e., the single-player game and the multi-player game are stored as described above, and therefore, the user can select a game to be played on the game selection screen. In a case of connecting with a plurality of game machines 12 in order to play the multi-player game, a user of a master machine can perform a selection on the game selection screen.

Figure 3:
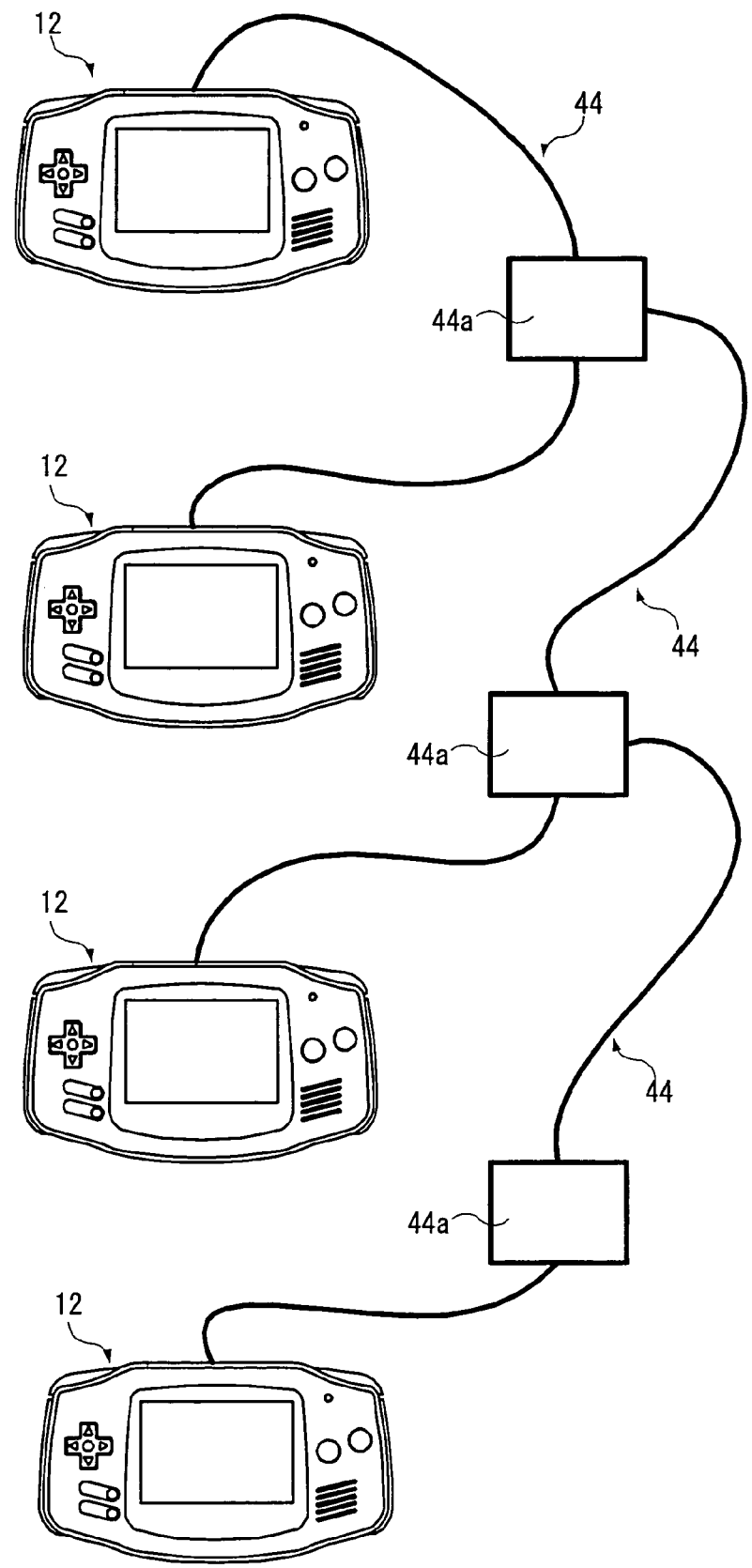
FIG. 3 is an exterior view showing one example of a connected state of the game apparatuses at a time of playing a multi-player game.

At a time of playing the multi-player game, the plurality of game machines 12 are connected with each other through the communication cable 44 as shown in FIG. 3. In this embodiment, four game machines 12 are connected with each other through three communication cables 44. Each of the communication cables 44 has at each end a connector (not shown) connectable with the communication connector 42 of the game machine 12 and has at a center thereof a connection box 44*a* having a connector (not shown) connectable with the connector at the end. By connecting the connector of the connection box 44*a* with one end of the connector of another communication cable 44, more than two game machines 12 can be connected with each other.

It is noted that the game machine 12 utilized in the embodiment is the game boy advance as one example, and in this case, a game boy advance dedicated communication cable (product name) can be applied as the communication cable 44.

The cartridge 14 may be loaded in all the game machines 12 and may be loaded in only the master machine. In a case of the cartridge of multi-cartridge type loading the cartridges in all the game machines 12, the backup data is stored in a predetermined backup area of the RAM 56 of each cartridge 14. In a case of the cartridge of one-cartridge type loading the cartridge in only the master machine, the backup data is stored in the predetermined backup area of the RAM 56 of the cartridge 14. It is noted that discrimination between the master machine and the slave machine may be performed by detecting a connecting state of the communication cables 44 in a hardware manner or and may be performed on the basis of a user operation on the selection screen and etc. in a software manner.

It is noted that the game apparatus 10 is formed by the game machine 12 and the cartridge 14 detachably loaded therein in this embodiment; however, it is needless to say that the ROM 54 and the RAM 56 built-in the cartridge 14 may be integrated with the game machine 12.

In the game apparatus 10, when any one of games is selected by a user operation, the selected game is started. If the predetermined condition is accomplished in progressing the game, information relating to the predetermined condition described later is written to the backup data storing area of the game and is further written to at least any one of the backup data storing areas of other games. Therefore, changes are applied to the backup data. Accordingly, in a case of playing the game corresponding to the changed backup data subsequently, changes are applied to the game in accordance with the backup data in the game progressing process, and therefore, it is possible to increase enjoyment at a time of playing the game. Thus, in the game machine 10, during playing one game, it is possible to write and read predetermined backup data from and to the backup storing area of another game, that is, it is possible to share the backup data between the plurality of games with each other.

Herein, information relating to the condition written in response to accomplishment of the predetermined condition includes condition accomplishment information and change generation information. The condition accomplishment information is for indicating that the predetermined condition is accomplished and includes the "sword beam" skill flag, the "10 medals" flag, the "WARASHIBE event" conquering flag and the "last boss" conquering flag in this embodiment. The change generation information is for generating specific changes in the progress of the game in accordance with the accomplishment of the condition and includes the "spin attack" skill flag, the "WARASHIBE event" flag and the "hidden dungeon" flag in this embodiment. For example, when the change generation information is read during the game progressing process, a specific change according to the change generation information occurs in the game. The "spin attack" skill, the "WARASHIBE event" and the "hidden dungeon" are specific changes in the game, and such the specific change occurs only when both of the single-player game and the multi-player game are played and the predetermined condition is accomplished in each of the games as described later.

Figure 9:
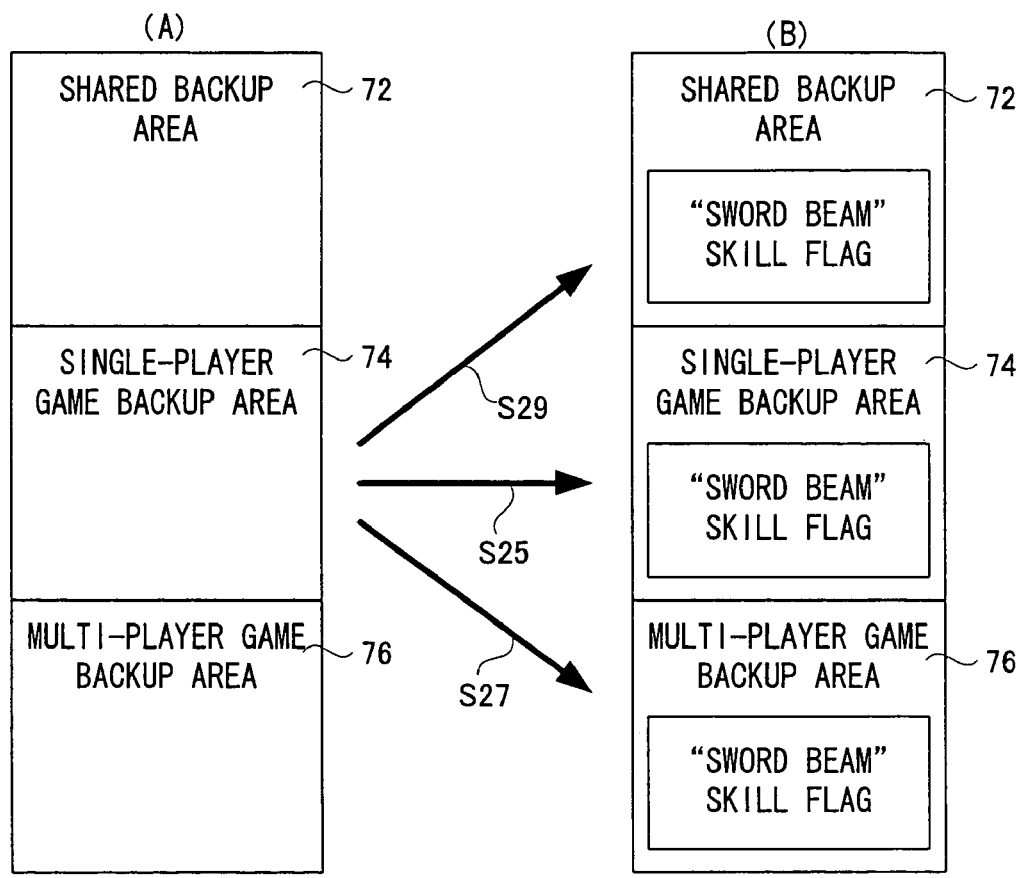
FIG. 9 is an illustrative view showing a state shifting in the RAM of the cartridge in a case a "sword beam" skill is learned in the single-player game.

For example, in a case that the player character learns the "sword beam" as a new sword skill in playing the single-player game, the "sword beam" skill flag is set in the multi-player game backup area 76 as well as in the single-player game backup area 74 as shown in FIG. 9.

Accordingly, if the multi-player game is played after the "sword beam" skill is usable in the single-player game, the "sword beam" skill is also usable in the multi-player game. That is, if both of the single-player game program and the multi-player game program share information (various data and programs) required for realizing a content (usage of the "sword beam" skill) indicated by the condition relating information (the "sword beam" skill flag), that is, if both the games have in common the required information in advance, the "sword beam" skill is usable in both the games. Furthermore, the "sword beam" skill flag is also set in the shared backup area 72, and this makes it possible to display on the game selection screen that the "sword beam" skill is learned by the player character.

Figure 10:
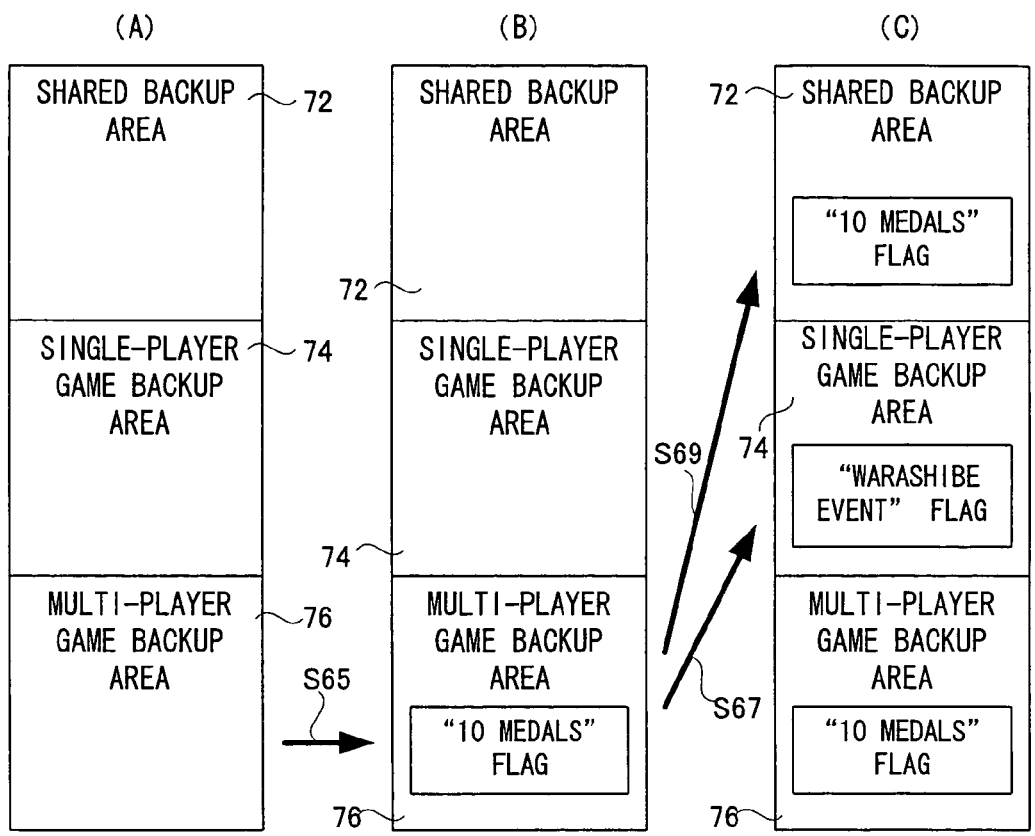
FIG. 10 is an illustrative view showing a state shifting in the RAM of the cartridge in a case 10 medals are collected in the multi-player game.

In addition, in a case the player character has collected 10 medals in the multi-player game, the "WARASHIBE event" flag is set in the single-player game backup area 74 as shown in FIG. 10(C) as well as the "10 medals" flag is set in the multi-player game backup area 76 as shown in FIG. 10(B).

Accordingly, in a case of playing the single-player game after succeeding in collecting 10 medals in the multi-player game, the "WARASHIBE event" can be generated in the single-player game. Thus, the "WARASHIBE event" is the specific event occurring in the single-player game when the 10 medals are collected by playing the multi-player game and can be played and enjoyed by only the user who accomplishes the condition. Furthermore, as understood form FIG. 10(C), the "10 medals" flag is also set in the shared backup area 72, and this makes it possible to confirm that the 10 medals has already been acquired on the game selection screen.

Furthermore, in a case the "WARASHIBE event" is cleared in the single-player game, the "spin attack" skill flag is set in both of the single-player game backup area 74 and the multi-player game backup area 76 as shown in FIG. 11(C) as well as the "WARASHIBE event" conquering flag is set in the single-player game backup area 74 as shown in FIG. 11(B).

Accordingly, in a case that the "WARASHIBE event" occurs and the event is cleared, the "spin attack" skill is set so as to be usable as the new sword skill in playing the single-player game and the multi-player game subsequently. Thus, the "spin attack" skill becomes effective by collecting 10 medals in the multi-player game and conquering the "WARASHIBE event" in the single-player game. Accordingly, the "spin attack" skill cannot be used by a user not playing the multi-player game, failing in medal collecting competition or the like. Furthermore, as understood from FIG. 11(C), the "spin attack" skill flag is set in the shared backup area 72, and this makes it possible to confirm that the "spin attack" skill has been learned on the game selection screen.

Furthermore, in a case of succeeding in defeating the "last boss" in both of the single-player game and the multi-player game, the "hidden dungeon" flag is set in the single-player game backup area 74 as shown in FIG. 12 and FIG. 13. It is noted that FIG. 12 is a state shifting in each of the backup areas in a case where the "last boss" is defeated in the single-player game after the "last boss" is defeated in the multi-player game, and FIG. 13 is, in a reverse conquering order to FIG. 12, shows a state shifting in each of the backup areas in a case where the "last boss" is defeated in the multi-player game after the "last boss" is defeated in the single-player game.

Accordingly, when playing the single-player game subsequently, it is possible to present on the game map and play the "hidden dungeon". That is, in a case of conquering the last boss in both the games, the user can enjoy playing the game in the "hidden dungeon" which has not been present in the previous game world or to which no one can enter. Thus, the "hidden dungeon" is a special dungeon which occurs in response to conquering the "last boss" in both the games. In addition, at the same time, the "last boss" conquering flag is also set in the shared backup area 72, and this makes it possible to confirm that the "last boss" is conquered in both the games on the game selection screen.

Thus, when the predetermined condition is accomplished in the progress of one game, the predetermined condition relating information is written to the backup area and etc. of another game which is not played, and whereby, changes are applied to the backup data. Accordingly, it is possible to share the backup data between the plurality of games, link contents between the respective games with each other or combine the contents between them, and therefore, this brings about a different enjoyment from a prior art such as increase of enjoyment in playing the game subsequently and a new enjoyment which is never obtained without playing another game or both the games.

Figure 6:
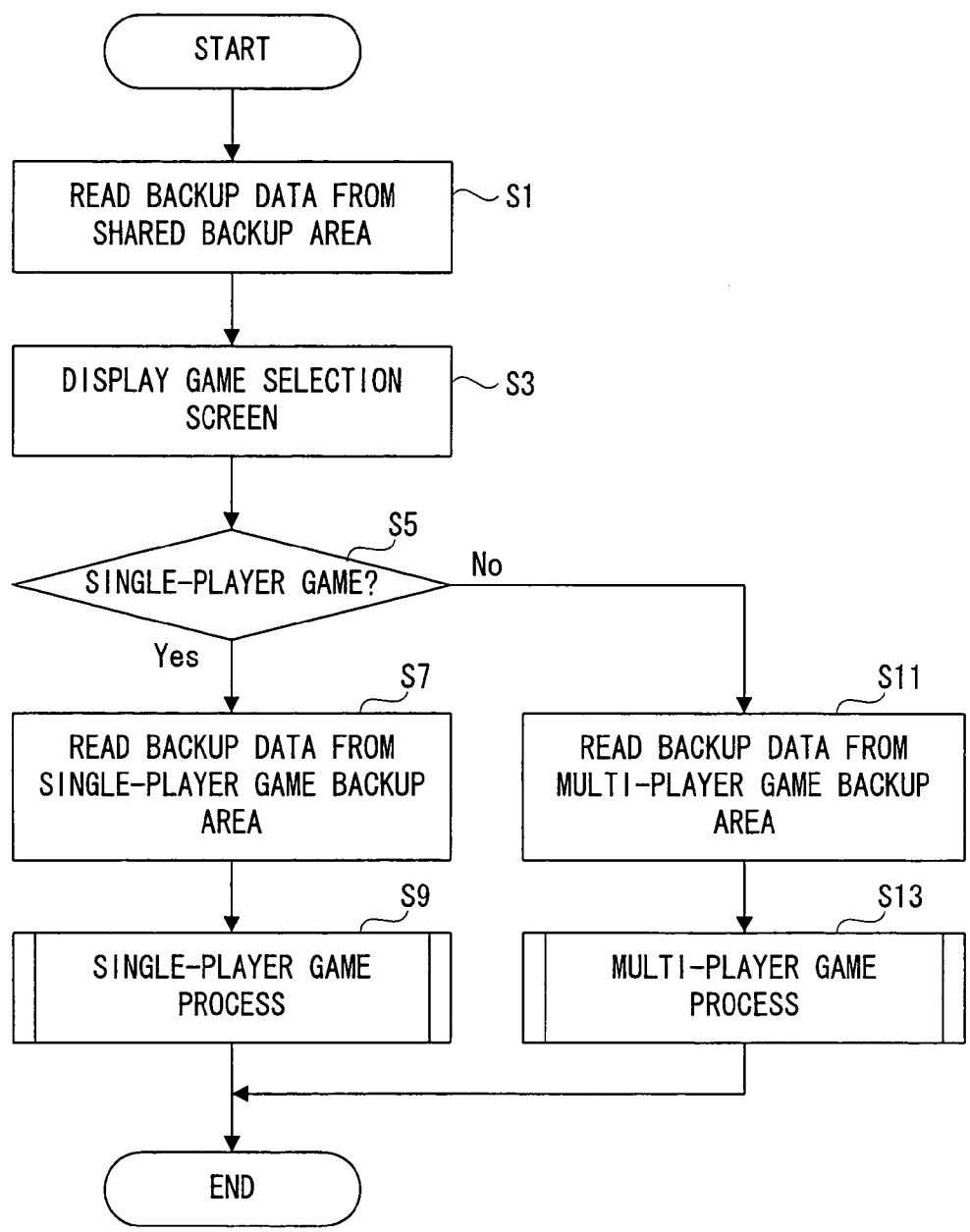
FIG. 6 is a flowchart showing a game operation in FIG. 1 embodiment.
Figure 7:
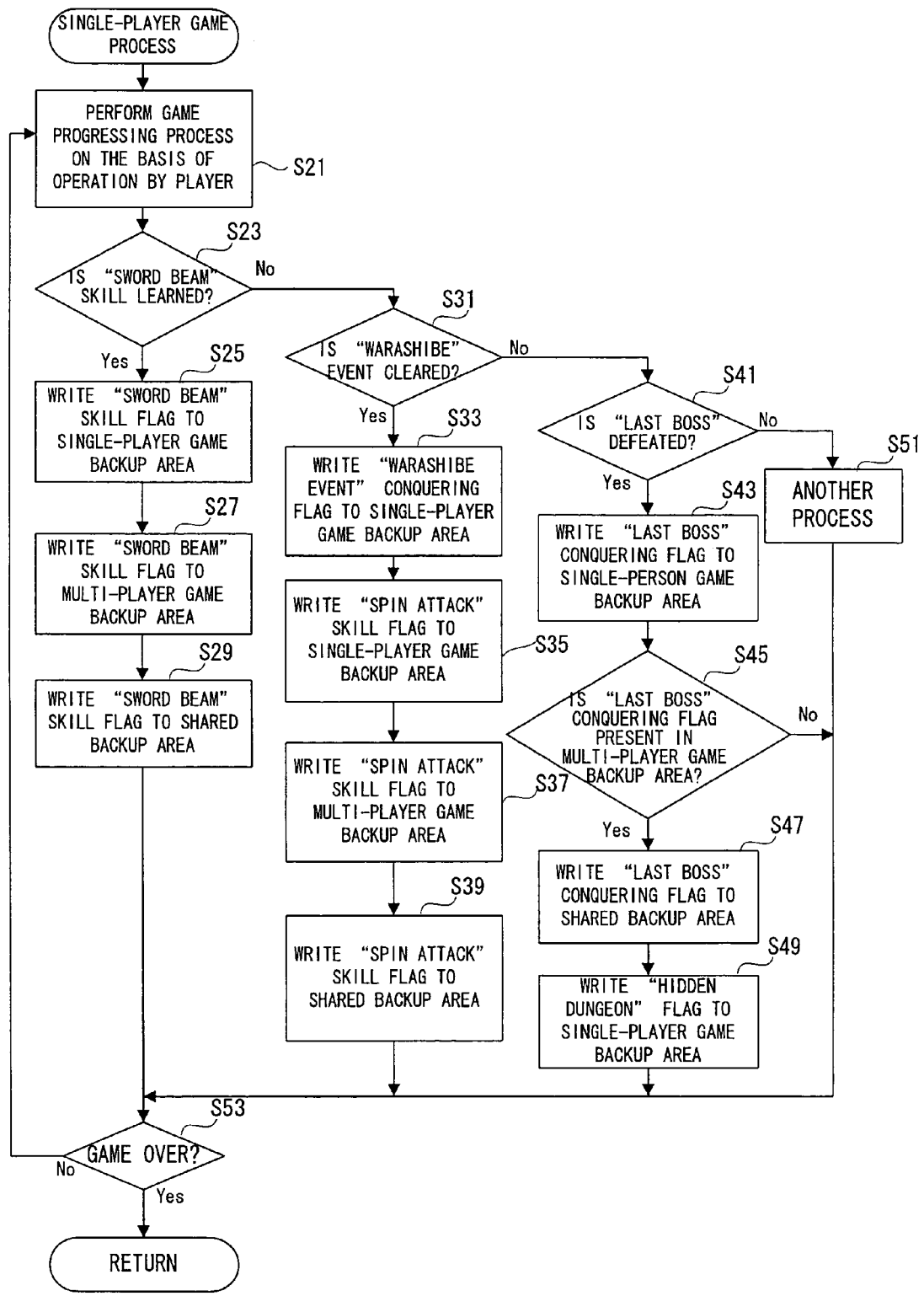
FIG. 7 is a flowchart showing a processing for single-player game in FIG. 6.
Figure 8:
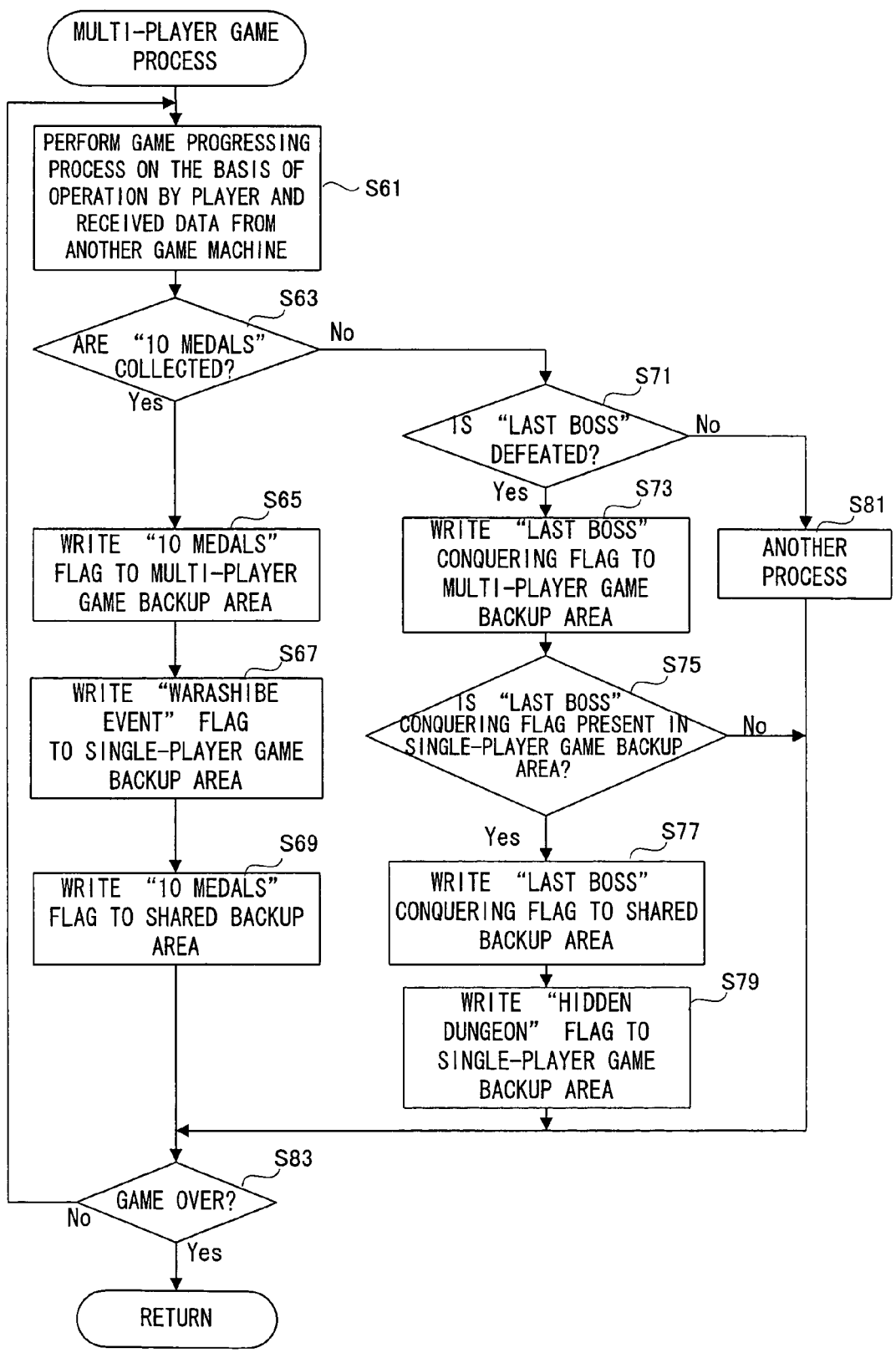
FIG. 8 is a flowchart showing a processing for multi-player game in FIG. 6.

The CPU 40 or the computer of the game machine 12 operates according to flowcharts shown in FIG. 6 to FIG. 8. When a power source of the game machine 12 is turned on, the CPU 40, as shown in FIG. 6, first reads the backup data from the shared backup area 72 of the RAM 56 of the cartridge 14 so as to write the same to the WRAM 50 in a step S1 and displays a game selection screen (not shown) on the LCD 16 in a step S3. In a case the backup data is present in the shared backup area 72, a player name, an acquired item, a sword skill, a course of conquering and etc. for each game are displayed on a game state displaying screen and so on included in the game selection screen. Accordingly, this allows the user to confirm a state of each of the games before selecting the game.

Then, it is determined whether or not the single-player game is selected in a step S5. If "YES" is in the step S5, that is, if the single-player game is selected by a user's operation, the backup data is read from the single-player game backup area 74 of the RAM 56 so as to write the same to the WRAM 50 in a step S7, and a single-player game process is executed in a following step S9. On the other hand, if "NO" in the step S5, that is, if the multi-player game is selected by the user's operation, the backup data is read from the multi-player game backup area 76 so as to write the same to the WRAM 50 in a step S11, and a multi-player game process is executed in a following step S13.

In the single-player game process in the step S9 and the multi-player game process in the step S13, each of the games is progressed according to the operation by the user. Then, when the predetermined condition is accomplished in the progress of the game, the predetermined backup data is written to the predetermined backup data area.

FIG. 7 shows one example of an operation of the CPU 40 in which backup data writing control is mainly performed in the single-player game of the step S9 (FIG. 6). A game progressing process is executed on the basis of the operation by the player in a step S21. In the game progressing process, the game is progressed by executing all the process required for progressing the game such as an image process of each game program except for the backup data writing control process. Furthermore, a process according to the information related to the written condition is also executed in the step S21.

In this embodiment, it is determined whether or not the predetermined condition is accomplished in following steps S23, S31 and S41. When it is determined that the predetermined condition is accomplished, a writing of the predetermined backup data (information relating to the condition) obtained by accomplishing the condition is performed.

In the step S23, it is determined whether or not the "sword beam" is learned. If "NO" in the step S23, the process proceeds to the next step S31; however, if "YES" in the step S23, that is, if the player character learns the "sword beam" skill, the "sword beam" skill flag is written to the single-player game backup area 74 in a step S25. Furthermore, the "sword beam" skill flag is also written to the multi-player game backup area 76 in a step S27. Furthermore, the "sword beam" skill flag is also written to the shared backup area 72 in a step S29. Through the process from the steps S25 to S29, the "sword beam" skill flag is set in the predetermined area of each of the backup areas as shown in FIG. 9. After completion of the process in the step S29, the process proceeds to a step S53. It is noted that it is determined whether or not the single-player game is completed in the step S53, and if "NO", the process returns to the step S21 so as to repeat the single-player game process.

The "sword beam" skill flag is written to the single-player game backup area 74 in the step S25. Accordingly, in the subsequent single-player game, it is possible to confirm that the player character has already learned the "sword beam" skill and to set the "sword beam" skill useable by reading the "sword beam" skill flag from the single-player game backup area 74 in the step S21. Furthermore, the "sword beam" skill flag is also written to the multi-player game backup area 76 which is not currently played in the step S27. Accordingly, in playing the subsequent multi-player game, it is possible to set the "sword beam" skill useable in the multi-player game also by reading the "sword beam" skill flag from the multi-player game backup area 76 in a step S61 in FIG. 8. In addition, the "sword beam" skill flag is written to the shared backup area 72 in the step S29. Accordingly, at a time of displaying the game selection screen subsequently, it is possible to display on the game selection screen that the character has already learned the "sword beam" skill in the process in the following step S3 by reading the "sword beam" skill flag from the shared backup area 72 in the process of the step S1 in FIG. 6.

Thus, when the predetermined condition (acquirement of the "sword beam" skill) is accomplished in the single-player game, the "sword beam" skill flag is written to both of the single-player game backup area 74 and the multi-player game backup area 76. This makes it possible to share the data between the games and to increase enjoyment at a time of playing the multi-player game.

It is determined whether or not the "WARASHIBE event" is cleared in the step S31. It is noted that the "WARASHIBE event" is an event occurring in the single-player game in a case the predetermined condition (collecting 10 medals) is accomplished in the multi-player game described above. For example, the "WARASHIBE event" occurs on the game by reading the "WARASHIBE event" flag from the single-player game backup area 74 in the process of the step S21.

If "NO" in the step S31, the process proceeds to the next step S41. On the other hand, if "YES" in the step S31, that is, if the "WARASHIBE event" is cleared, the "WARASHIBE event" conquering flag is written to the single-player game backup area 74 in a following step S33 (see FIG. 11(B)). Furthermore, the "spin attack" skill flag is written to the single-player game backup area 74 in a step S35, the "spin attack" skill flag is written to the multi-player game backup area 76 in a step S37, and the "spin attack" skill flag is written to the shared backup area 72 in a step S39 (see FIG. 11(C)). After completion of the process in the step S39, the process proceeds to the step S53.

Thus, the "WARASHIBE event" conquering flag is written to the single-player game backup area 74 in the step S33. Accordingly, by reading the "WARASHIBE event" conquering flag from the single-player game backup area 74 in the step S21 when subsequently playing the single-player game, it is possible to confirm that the "WARASHIBE event" is conquered. Therefore, it is possible to change to the game progress such as not generating the "WARASHIBE event" subsequently, generating another event or shifting to another stage. In addition, since the "spin attack" skill flag is written to the single-player game backup area 74 in the step S35. Accordingly, by reading the "spin attack" skill flag from the single-player game backup area 74 in the process of the step S21 when subsequently playing the single-person game, the player character can use the "spin attack" skill. Furthermore, the "spin attack" skill flag is also written to the multi-player game backup area 76 which is not currently played. Accordingly, by reading the "spin attack" skill flag from the multi-player game backup area 76 in a process of the step S61 (see FIG. 8) when subsequently playing the multi-player game, the player character can use the "spin attack" skill in the multi-player game also. In addition, the "spin attack" skill flag is written to the shared backup area 72 in the step S39. Accordingly, by reading the "spin attack" skill flag from the shared backup area 72 in the process of the step S1 (FIG. 6) when subsequently displaying the game selection screen, it is possible to notice a fact that the character has already learned the "spin attack" skill flag in the process of the following step S3.

Thus, when the predetermined condition (clearing of the "WARASHIBE event") is accomplished in the single-player game, the "spin attack" skill flag is written to both of the single-player game backup area 74 and the multi-player game backup area 76. This makes it possible to share the data between the games and increase enjoyment at a time of playing the multi-player game. Furthermore, a condition for obtaining the "spin attack" skill (clearing of the "WARASHIBE event") is based on accomplishment of another condition (collecting 10 medals) in the multi-player game and therefore, it is possible to bring about enjoyment which cannot be obtained without playing the multi-player game and clearing the predetermined condition.

It is determined whether or not the "last boss" is defeated in the step S41. If "NO" in the step S41, the process proceeds to a step S51. On the other hand, if "YES" in the step S41, that is, if the "last boss" is conquered, the "last boss" conquering flag is written to the single-player game backup area 74 in a step S43 (see FIG. 12(B)). Thus, by reading the "last boss" conquering flag from single-player game backup area 74, it is possible to confirm that the "last boss" has already been conquered in the single-player game.

Then, it is determined whether or not the "last boss" conquering flag is present in the multi-player game backup area 76 in a step S45. If "NO" in the step S45, the process proceeds to the step S53.

On the other hand, if "YES" in the step S45, that is, if the "last boss" has already been conquered in the multi-player game also, the "last boss" conquering flag is written to the shared backup area 72 in a following step S47 (see FIG. 12(C)). Thus, by reading the "last boss" conquering flag from the shared backup area 72 in the step S1, it is possible to display conquering of the "last boss" in both of the single-player game and the multi-player game in the following step S3 (FIG. 6) at a time of displaying the game selection screen subsequently.

Then, the "hidden dungeon" flag is written to the single-player game backup area 74 in a step S49 (see FIG. 12(C)). Accordingly, by reading the "hidden dungeon" flag from the single-player game backup area 74 in the step S21 when playing the single-player game, it is possible to set such that the "hidden dungeon" which has not been present before appears on a game map, and the player can play the "hidden dungeon".

Thus, when the predetermined conditions (conquering the last boss) are accomplished in both the games, the "hidden dungeon" flag is written to the single-player game backup area 74 and therefore, new enjoyment which cannot be obtained without playing both the games and clearing the predetermined condition can be brought about at a time of playing the subsequent single-player game.

Another process is executed in the step S51. The process is another process relating to the backup data writing control in the single-player game. By executing such the process, the progress situation data such as a level of the player character and etc., the other acquired item, the sword skill, the conquering flag and so on are written to the single-player game backup area 74 and to the shared backup area 72 as necessary in response to a user's operation or at a predetermined timing. Also, in a case the initial setting data such as player name, brightness of screen, language and etc. is set at a start of the single-player game, these are written to the shared backup area 72 as the shared information. After completion of the process in the step S51, the process proceeds to the step S53.

It is determined whether or not the single-player game is completed in the step S53, and if "YES" in the step S53, that is, if the user selects completion of the game, the single-player game process is completed.

FIG. 8 shows a process mainly performing the backup data writing control in the multi-player game process in the step S13 (FIG. 6). First, the game progressing process is executed on the basis of the player's operation and received data from another game machine 10 in the step S61. In the game progressing process, all the processes required for progressing the game except for the backup data writing control process such as image process, communication control process of each game programs are executed so as to progress the game. Furthermore, a process corresponding to the information relating to the written condition is also executed in the step S61.

Then, it is determined whether or not the predetermined condition is accomplished in following steps S63 and S71, and if it is determined that the predetermined condition is accomplished, writing of the predetermined backup data (information relating to the condition) is performed.

It is determined whether or not "10 medals" are collected in the step S63. If "NO" in the step S63, the process proceeds to the next step S71. On the other hand, if "YES" in the step S63, that is, if the player character has collected 10 medals, the "10 medals" flag is written to the multi-player game backup area 76 in a following step S65 (see FIG. 10 (B)). Then, the "WARASHIBE event" flag is written to the single-player game backup area 76 in a step S67, and the "10 medals" flag is also written to the shared backup area 72 in a step S69 (see FIG. 10(C)). It is noted that after completion of the process in the step S69, the process proceeds to a step S83 so as to determine whether or not the multi-player game is completed, and if "NO", the process returns to the step S61 so as to repeat the multi-player game process.

Thus, the "10 medals" flag is written to the multi-player game backup area 76 in the step S65. Accordingly, by reading the "10 medals" flag from the multi-player game backup area 76 in the step S61 when playing the multi-player game, it is possible to confirm that the player character obtains the "10 medals". Furthermore, by writing the "WARASHIBE event" flag to the single-player game backup area 74 in the step S67, it is possible to generate the "WARASHIBE event" as described above in the subsequent single-player game. Furthermore, by conquering the "WARASHIBE event", it is possible to use "spin attack" skill. In addition, the "10 medals" flag is written to the shared backup area 72 in the step S69. Accordingly, by reading the "10 medals" flag from the shared backup area 72 in the process of the step S1 (FIG. 6) at a time of displaying the game selection screen subsequently, collecting the 10 medals can be noticed at a time of playing the multi-player game in the step S3.

That is, when the predetermined condition (collecting "10 medals") is accomplished in the multi-player game, the "WARASHIBE event" flag is written to the single-player game backup area 74. This makes it possible to bring about new enjoyment which cannot be obtained without playing the multi-player game and clearing the predetermined condition.

It is determined whether or not the "last boss" is defeated in the step S71. If "NO" in the step S71, the process proceeds to a step S81. On the other hand, if "YES" in the step S71, that is, if the "last boss" is conquered in the multi-player game, the "last boss" conquering flag is written to the multi-player game backup area 76 in a following step S73 (see FIG. 13(B)). By reading the "last boss" conquering flag from the multi-player game backup area 76 when subsequently playing the multi-player game, it is possible to confirm the "last boss" has already been conquered.

Then, it is determined whether or not the "last boss" conquering flag is present in the single-player game backup area 74 in a step S75. If "NO" in the step S75, the process proceeds to the step S83.

On the other hand, if "YES" in the step S75, that is, if "the last boss" has already been defeated in the single-player game, the "last boss" conquering flag is written to the shared backup area 72 in a following step S77 (See FIG. 13(C)). Thus, at a time of displaying the game selection screen subsequently, by reading the "last boss" conquering flag from the shared backup area 72 in the process of the step S1 (FIG. 6), it is possible to display the fact that the "last boss" is defeated in both of the single-player game and the multi-player game in following process of the step S3.

Then, the "hidden dungeon" flag is written to the single-player game backup area 74 in a step S79 (see FIG. 13(C)).

Accordingly, at a time of playing the single-player game subsequently, it is possible to set such that the "hidden dungeon" which has not been present before appears on the game map as described above, and it is possible for the player to play the "hidden dungeon". Thus, it is possible to bring about new enjoyment which cannot be obtained without playing both the games and clearing the predetermined condition.

Another process is executed in the step S81. The process is another process relating to the backup data writing control in the multi-player game. By executing such the process, the progress situation data such as a level of the player character and etc., the other acquired item, the sword skill, the conquering flag and so on are written to the multi-player game backup area 76 and to shared backup area 72 as necessary in response to a user's operation or at a predetermined timing. Also, in a case the initial setting data such as player name, brightness of screen, language and etc. are set at a start of the multi-player game, these are written to the shared backup area 72 as the shared information. After completion of the process in the step S81, the process proceeds to the step S83.

It is determined whether or not the multi-player game is completed in the step S83, and if "YES" in the step S83, that is, if the user of the master machine selects completion of the game, the multi-player game process is completed.

According to this embodiment, when any one of the single-player game and the multi-player game is selected and played, if the predetermined condition is accomplished at least in the progress of the selected game, the information relating to the condition (condition accomplishment information and change generation information) is written to both of the backup data storing area for the related game and the backup data storing area for another game, and whereby, changes are brought about, and therefore, it is possible to increase enjoyment at a time of playing the game subsequently. Accordingly, it is possible to bring about different enjoyment from the prior art in which a scenario of the game is changed depending upon backup data of another game at a start of a game.

Furthermore, the shared backup area 72 is provided, and the shared information utilized in common between the plurality of games is written thereto. Accordingly, there is no need to store the information in each of the backup data areas 74 or 76, and therefore it is possible to reduce the capacity of the backup memory.

It is noted that when the predetermined condition (conquering the last boss) is accomplished in both the games, the "hidden dungeon" flag is written to only the single-player game backup area 74 in the above-described embodiment (step S49 or step S79); however, the "hidden dungeon" flag may be written to the multi-player game backup area 76 in another embodiment. In this case, the "hidden dungeon" is presented on the game map so as to be playable in the multi-player game. In addition, after the "hidden dungeon" flag is written to both of the single-player game backup area 74 and the multi-player game backup area 76, the "hidden dungeon" may become playable in playing both the games subsequently.

Furthermore, although the plurality of game programs different in type (i.e., between the single-player game and the multi-player game) are stored in the ROM 54 of the cartridge in the above-described embodiments, the plurality of game programs the same in type (i.e., between the single-player games, between the multi-player games or the like) may be stored in the ROM 54 so as to share data between them.

Furthermore, although the plurality of game programs the same in genre (kind) of action RPG may be stored in the above-described embodiment, the plurality of game programs different in genre are stored in the ROM 54 so as to share the backup data between the games different in genre. Thus, even if the games are different in genre, respective of the contents of the games are linked or combined with each other, for example, and therefore, enjoyment in the subsequent playing can be increased, that is, new enjoyment which cannot be obtained without playing another game or both the games is brought about.

For example, an action game in which the player character defeats appearing enemy characters so as to clear a stage and an RPG in which the player character adventures with growth may be stored in the ROM 54. In this case, when an "arms item" is acquired in the action game, by writing an "arms item" flag to both of an action game backup area and an RPG backup area, it is possible to utilize the "arms item" in the RPG also.

Furthermore, in a case a base ball game and a puzzle game are stored, when in the baseball game, one team wins the game by ten points, a "ten-run" flag is written to one backup area for the baseball game, and a "bonus game" flag is written to another backup area for the puzzle game, and therefore, a "bonus game" is playable in the puzzle game.

In addition, a case that a capturing game for capturing and raising a monster character and a race game for driving a car and competing for an order are stored is taken as an example. In the capturing game, when more than 30 kinds of monster characters are captured, a "30-kind" flag is written to a backup area for the capturing game, and in the race game, when ranking first consecutive five times, a "consecutive five times first rank" flag is written to a backup area for the race game. Then, when both of the "30-kind" flag and the "consecutive five times first rank" flag are written, by writing a "new-kind-of-monster character" flag to the backup area of the capturing game, a "new monster character" can be presented in the capturing game.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus that enables a player to play a plurality of games stored on said game apparatus, said game apparatus configured to store information relating to conditions occurring during progress of a game into different backup data storage areas that are separately associated with a game, comprising:
    a game program data storage memory for storing said plurality game programs;
    a backup data storage memory having a first backup data storing area for storing game backup data relating to a first game program and a second backup data storing area for storing game backup data relating to a second game program;
    a game operation controller, said operation controller initializing a start of game play by enabling a player to select any one of said first game program and said second game program and enabling said player to control progress of a selected game;
    a game condition detector, said game condition detector determining whether or not a predetermined game condition is accomplished during gameplay of a game in progress on the apparatus; and
    a memory write controller which, at a time when the game condition detector determines that a redetermined game condition is accomplished, automatically writes information relating to the accomplished game condition into both said first backup data storing area and said second backup data storing area being arranged separately from said first backup data storing area, regardless of which game program was started by said game operation controller.

2. A game apparatus according to claim 1, wherein the backup data storage memo includes a separate shared backup data storm area which is used to store information used in common by a plurality of different games.

3. A game apparatus according to claim 1, wherein the information relating to the predetermined game condition includes condition accomplishment information indicating that the predetermined game condition is accomplished and change generation information for generating changes in the progress of the game in response to accomplishment of the predetermined condition, and
    said memory write controller writes the condition accomplishment information to said backup data storing area of one game and writes the change generation information to said backup data storing area of another game.

4. A game apparatus according to claim 1, wherein the information relating to the predetermined condition includes condition accomplishment information indicating that the predetermined condition is accomplished and change generation information for generating changes in the progress of the game in response to accomplishment of the predetermined condition, and
    said memory write controller writes the condition accomplishment information to said backup data storing area of one game and writes the change generation information to both of the backup data storing area of one game and said backup data storing area of another game stored on said game apparatus.

5. A game apparatus according to claim 1, wherein the information relating to the predetermined condition includes condition accomplishment information indicating that the predetermined condition is accomplished and change generation information for generating changes in the progress of the game in response to accomplishment of the predetermined condition, and
    said memory write controller further comprising a second condition detector for determining whether or not the predetermined condition is also accomplished in another game when the predetermined condition is accomplished by said first condition detector wherein said memory write controller writes the condition accomplishment information to said backup data area of one game when it is determined that the predetermined condition is accomplished by said first condition detector and writes the change generation information to said backup data storing area of another game when it is also determined that the predetermined condition is accomplished by said second condition detector in said another game stored on said game apparatus.

6. A game apparatus according to claim 1, wherein said writable and readable backup data storage memory further comprises a shared backup data storing area for storing backup data relating to both said first game program and said second game program, and
    said memory write controller further writes to said shared backup data storing area shared information utilized in common to both said first game program and said second game program.

7. A game apparatus according to claim 5, wherein said memory write controller writes the change generation information to said backup data storing area of another game and also to said backup data storing area of one game when it is determined that the predetermined condition is also accomplished by said second condition detector in said another game.

8. In a game apparatus that enables an operator to play a plurality of games, a method enabling information relating to gameplay conditions occurring during gameplay progress of one game to be used by one or more other games that are also stored on said apparatus, said game apparatus including a processor and a data storage memory having a plurality of distinct storage areas for respectively storing backup data for each of said plurality of games, comprising:
    determining whether or not a predetermined game condition is accomplished during gameplay of any one of said plurality of games in which gameplay has been initiated; and
    writing, at a time when it is determined that the predetermined game condition is accomplished, information relating to the predetermined game condition into both a backup data storing area of a game in which progress of gameplay has been initiated and into a backup data storing area of at least one other game also stored on said apparatus in which progress of gameplay has not been initiated, wherein said game apparatus autonomously stores information relating to an occurrence of predetermined conditions during gameplay progress of at least one game into a backup storing area associated with each one or more of other games that are also stored on said game apparatus.

9. A backup writing control method in a game apparatus that enables an operator to play a plurality of games, said apparatus including a data storage memory having a plurality of separate storage areas for respectively storing backup data associated with each game version, said backup writing control method comprising:

determining whether or not a predetermined game condition is accomplished during gameplay progress of any one of said plurality of games in which gameplay is started; and writing, at a time upon determining that the predetermined gameplay condition is accomplished, information relating to the predetermined game condition into both a backup data storage area associated with a game being played in which the predetermined game condition is accomplished and into a backup data storing area associated with at least one other game in which gameplay has not been started, and wherein said game apparatus automatically stores information relating to an occurrence of predetermined conditions during gameplay progress of a game being played into a backup storing area associated with other games that are also stored on said game apparatus.

10. A game apparatus which enables a player to play a plurality of games stored on said game apparatus, comprising:

a game program storage for storing at least a first game program and a second game program;

a read/write data storage memory having a first backup data storing area for storing backup data relating to said first game program and a second backup data storing area for storing data relating to said second game program;

a game operation controller, said operation controller initializing start of gameplay by enabling a player to select any one of said first game program and said second game program and enabling said player to progress gameplay of a selected game;

a first condition detector that determines whether or not a predetermined game condition is accomplished during gameplay progress of a first game selected and started;

a first writing controller that autonomously writes, at a time a determination is made by the first condition controller that the predetermined condition is accomplished, condition accomplishment information indicating that the predetermined condition is accomplished to said backup data storing area of one game;

a second condition detector that determines whether or not the predetermined condition is also accomplished in at least one other game stored on said apparatus that was not selected by said operation controller once said first condition detector determines that the predetermined condition is accomplished; and a second writing controller that autonomously writes change generation information for use in generating changes during gameplay progress of the game to the backup data storing area of one game at a time when said second condition detector determines that the predetermined condition is accomplished in said another game, wherein said game apparatus stores information relating to predetermined conditions occurring during gameplay of at least one game into a backup data store associated with each of one or more other games that are also stored on said game apparatus, enabling information relating to gameplay conditions occurring during gameplay progress of one game to be used by one or more other games that are also stored on said apparatus.

11. A game apparatus which enables an operator to play a plurality of games stored on said apparatus, comprising:

game program data storage memory, said game program data memory being used to store at least a first game program and a second game program;

readable and writable backup data storage memory having a first backup data storing area for storing backup data relating only to said first game program, a second backup data storing area for storing data relating only to said second game program and a common backup data storing area for storing data relating to gameplay conditions that are relevant to gameplay for both said first game program and said second game program; and memory writing controller programmed logic circuitry configured to autonomously write information in said common backup data storing area that relates to gameplay conditions that are relevant to gameplay for both said first game program and said second game program, wherein said memory writing controller programmed logic circuitry enables the game apparatus to store information relating to predetermined conditions occurring during gameplay of at least one game into a backup data store associated with each of one or more other games that are also stored on said game apparatus, enabling information relating to gameplay conditions occurring during gameplay progress of one game to be used by one or more other games that are also stored on said apparatus.

12. A game apparatus according to claim 11, further comprising:

game operation controller programmed logic circuitry configured to initiate a start of gameplay by selecting any one of said first game program and said second game program and for controlling progress of a selected game; and condition detector programmed logic circuitry configured to determine whether or not a predetermined condition is accomplished during gameplay progress of a selected and started game; wherein said memory writing controller programmed logic circuitry writes information relating to the predetermined condition to said common backup data storing area upon a determination by said condition detector programmed logic circuitry that the predetermined condition is accomplished.

13. In a game apparatus having a game program processor that enables an operator to play a plurality of games and which includes a data storage medium for storing game information and a game operation controller device, wherein said data storage medium includes at least a first game program and a second game program and wherein said game apparatus further includes a backup data storage medium having a first backup data storing area for storing backup data relating to said first game program and a second backup data storing area for storing data relating to said second game program, a computer program embodied on said storage medium and executable on said game program processor, comprising:

program instruction means for determining whether or not a predetermined condition is accomplished during gameplay of any one game; and program instruction means for autonomously writing, upon determining that the predetermined condition is accomplished during gameplay of said one game, information relating to the predetermined condition to into both a backup data storing area associated with a game in which said predetermined condition is accomplished and into a backup data storing area associated with at least one other game program that is also stored on said storage medium.

14. A game apparatus which enables an operator to play a plurality of game versions stored on said game apparatus and which includes a game operation controller and a game program processor, comprising:

game program storage medium for storing at least a first game program and a second game program;

readable and writable backup data storage medium having a first backup data storing area for storing backup data relating to said first game program, a second backup data storing area for storing data relating to said second game program, and a third backup data storing area for storing backup data relating to information that is utilized in common by both of said first game program and said second game program; and writing control programmed logic circuitry configured to autonomously write into said third backup data storing area only said information that is utilized in common by both said first game program and said second game program.

* * * * *